US012621060B2

(12) United States Patent
Ahn et al.

(10) Patent No.: US 12,621,060 B2
(45) Date of Patent: May 5, 2026

(54) METHOD FOR PERFORMING QUANTUM SECURE DIRECT COMMUNICATION IN QUANTUM COMMUNICATION SYSTEM, AND APPARATUS THEREFOR

(71) Applicant: LG Electronics Inc., Seoul (KR)

(72) Inventors: Byungkyu Ahn, Seoul (KR); Sangrim Lee, Seoul (KR); Hojae Lee, Seoul (KR); Jayeong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 264 days.

(21) Appl. No.: 18/290,639

(22) PCT Filed: Jul. 21, 2021

(86) PCT No.: PCT/KR2021/009420
§ 371 (c)(1),
(2) Date: Jan. 19, 2024

(87) PCT Pub. No.: WO2023/003054
PCT Pub. Date: Jan. 26, 2023

(65) Prior Publication Data
US 2024/0267133 A1 Aug. 8, 2024

(51) Int. Cl.
*H04B 10/00* (2013.01)
*H04B 10/85* (2013.01)
*H04J 14/00* (2006.01)
(52) U.S. Cl.
CPC ..................................... *H04B 10/85* (2013.01)
(58) Field of Classification Search
CPC ........................................................ H04B 10/70
See application file for complete search history.

(56) References Cited

U.S. PATENT DOCUMENTS

2012/0177134 A1* 7/2012 Shields .................. H04B 10/70
375/259
2016/0234017 A1 8/2016 Englund et al.
(Continued)

FOREIGN PATENT DOCUMENTS

KR 10-2013-0069860 6/2013
KR 10-2018-0128646 12/2018

OTHER PUBLICATIONS

Qi et al., "A 15-user quantum secure direct communication network," CoRR, submitted on Jun. 25, 2021, arXiv:2106.13509v1, 6 pages.
(Continued)

*Primary Examiner* — Daniel G Dobson
(74) *Attorney, Agent, or Firm* — Fish & Richardson P.C.

(57) ABSTRACT

The present specification provides a quantum secure direct communication (QSDC) method by which a transmitting end transmits a message on the basis of differential time coding, in a quantum communication system. More specifically, the method comprises the steps of: receiving, from a receiving end on a quantum channel, (i) at least one initial time state configured by including a time interval equal to a dead time of a single photon detector of the receiving end and (ii) at least one initial phase state; receiving, from the receiving end on a classical channel, time state location information for selecting a specific initial time state for encoding of information transmitted to the receiving end; selecting the specific initial time state for the encoding, on the basis of the time state location information: generating an encoding time state by encoding the information on the basis of the selected specific initial time state, the encoding time state being generated by applying a time shift on the basis of a value of the information being encoded; and transmitting a message including the encoding time state to the receiving end through the quantum channel, wherein the message is restored on the basis of a time difference between (Continued)

information on the at least one initial time state stored in the receiving end and information on the encoding time state.

17 Claims, 29 Drawing Sheets

(56) References Cited

U.S. PATENT DOCUMENTS

| | | | |
|---|---|---|---|
| 2017/0279540 A1* | 9/2017 | Tanizawa | H04B 10/70 |
| 2017/0317814 A1 | 11/2017 | Grice et al. | |
| 2020/0059358 A1 | 2/2020 | Legre et al. | |

OTHER PUBLICATIONS

Rim et al., "Quantum Secure Direct Community using Time Lag," Journal of the Korea Institute of Information and Communication Engineering, Dec. 2017, 21(12): 2318-2324.
Extended European Search Report in European Appln. No. 21951002. 1, mailed on Apr. 2, 2025, 8 pages.
Williams et al., "Implementation of Quantum Key Distribution and Quantum Clock Synchronization via Time Bin Encoding," Paper, Presented at the Proceedings of the SPIE, Virtual Event, Mar. 6-12, 2021, 11699; Quantum Computing, Communication, and Simulation, Mar. 2021, pp. 1169908.1-1169908.10.

* cited by examiner

FIG. 4

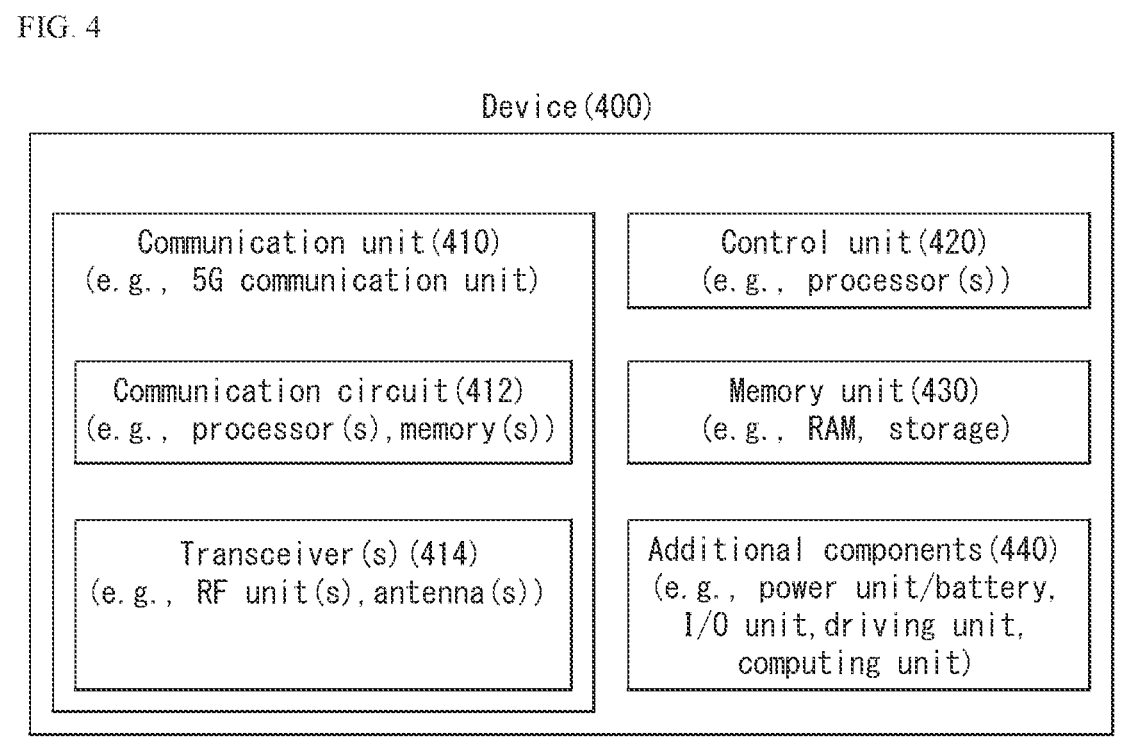

Device(400)

Communication unit(410)
(e.g., 5G communication unit)

Communication circuit(412)
(e.g., processor(s),memory(s))

Transceiver(s)(414)
(e.g., RF unit(s),antenna(s))

Control unit(420)
(e.g., processor(s))

Memory unit(430)
(e.g., RAM, storage)

Additional components(440)
(e.g., power unit/battery,
I/O unit,driving unit,
computing unit)

1010

| Detector type | Operating temperature (K) | Detection efficiency (%) | Dark count (Hz) | Dead time (ns) | Jitter (ps) | Photon number decomposition |
|---|---|---|---|---|---|---|
| PMT(visible) | 300 | 45@550nm | 100 | – | 50 | Impossible |
| PMT(IR) | 200 | 2@1,550nm | 200,000 | – | 300 | Impossible |
| Si SPAD | 263 | 80@800nm | 200 | 50 | 400 | Impossible |
| InGaAs SPAD | 250 | 25@1,550nm | 50 | 1,000 | 150 | Impossible |
| TES | 0.1 | 95@1,550nm | – | ~1,000 | 100,000 | Possible |
| SNSPD | 2.7 | 85@1,550nm | 300 | 30 | 25 | Impossible |

T:SPD dead time $|t_1\rangle$

1110

$|t_0\rangle$

1120

| 2-D | | 4-D | | 8-D | | N-D | |
|---|---|---|---|---|---|---|---|
| State type | Detection probability | State type | Detection probability | State type | Detection probability | State type | Detection probability |
| Phase state | 50% | Phase state | 25% | Phase state | 12.5% | Phase state | $\frac{1}{N} \times 100\%$ |
| Time state | 75% | Time state | 62.5% | Time state | 56.25% | Time state | $\left(\frac{N+1}{2N}\right) \times 100\%$ |

FIG. 19

Phases: 0  0  ...  0

$1910 \longrightarrow |f_0\rangle$ $\Rightarrow$ 00...00 k bits

Phases: 0  $\dfrac{2\pi}{N}$  ...  $\dfrac{2(N-1)\pi}{N}$ $1920 \longrightarrow |f_1\rangle$ $\Rightarrow$ 00...01

Phases: 0  $\dfrac{2t\pi}{N}$  ...  $\dfrac{2(N-1)t\pi}{N}$ $19N0 \longrightarrow |f_t\rangle$ $\Rightarrow$ 11...11

FIG. 20

Phases: 0  0  ...  0

$1910 \longrightarrow |f_0\rangle$ $\Rightarrow$ 00...00 k bits

Phases: 0  $\dfrac{2\pi}{N}$  ...  $\dfrac{2(N-1)\pi}{N}$ $1920 \longrightarrow |f_1\rangle$ $\Rightarrow$ 00...01

Phases: 0  $\dfrac{2t\pi}{N}$  ...  $\dfrac{2(N-1)t\pi}{N}$ $19N0 \longrightarrow |f_t\rangle$ $\Rightarrow$ 11...11

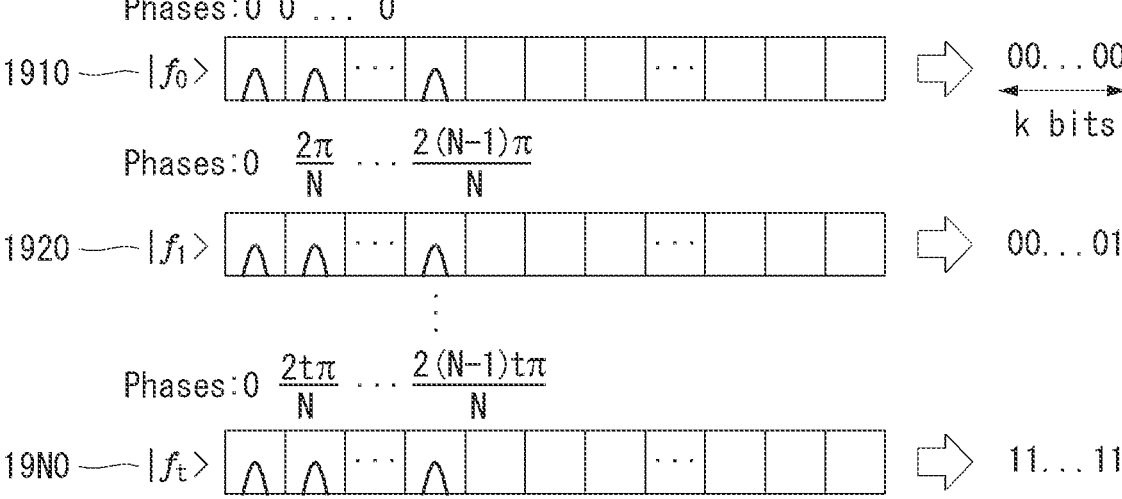

FIG. 24
(a)
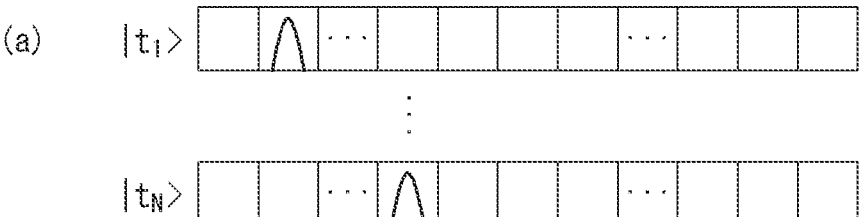

FIG. 29

| Encoding information ($\log_2 N$ bits) | Time shift | Delay line length(l) |
|:---:|:---:|:---:|
| 00...0 | 0 | 0 |
| 00...1 | $\tau$ | $\tau c$ |
| ⋮ | ⋮ | ⋮ |
| 11...1 | $(N-1)_\tau$ | $(N-1)\tau c$ |

FIG. 31

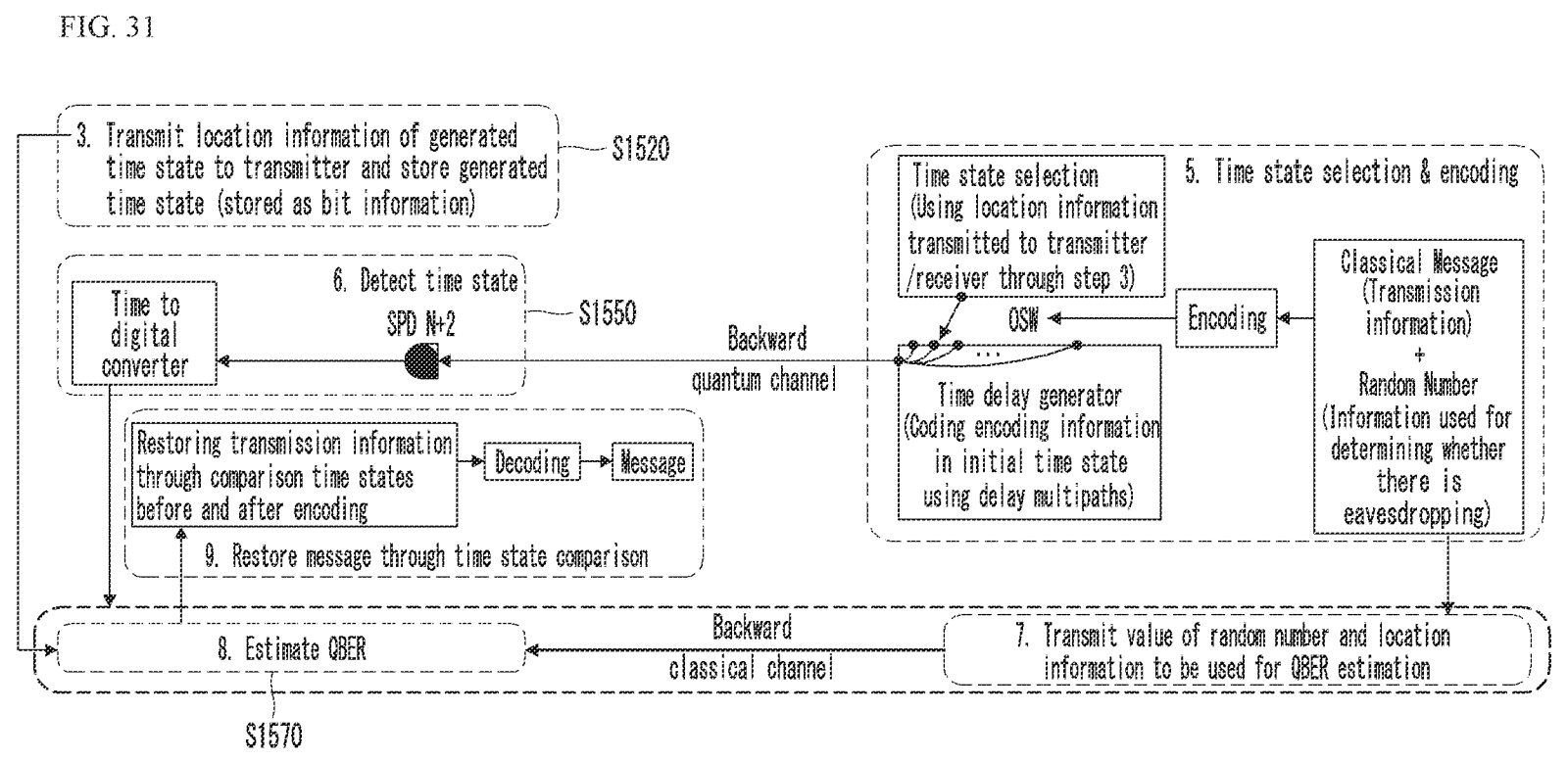

5. Time state selection & encoding

Classical Message
(Transmission
information)
+
Random Number
(Information used for
determining whether
there is
eavesdropping)

Encoding

Time state selection
(Using location information
transmitted to transmitter
/receiver through step 3)

OSW

Time delay generator
(Coding encoding information
in initial time state
using delay multipaths)

Backward
quantum channel

7. Transmit value of random number and location
information to be used for QBER estimation Backward
classical channel

S1520

3. Transmit location information of generated
time state to transmitter and store generated
time state (stored as bit information)

S1550

6. Detect time state

SPD N-2

Time to
digital
converter

Restoring transmission information
through comparison time states
before and after encoding 9. Restore message through time state comparison Decoding Message 8. Estimate QBER

| $\dfrac{\text{Light generation speed}}{\text{SPD detection speed}} = \dfrac{T}{\tau}$ | Max. dimension k | Maximum classical information amount which can be transmitted in each state ($\lfloor \log_2 k \rfloor$ bits/photon) | Information transmission amount improvement ratio (Compared to existing 2-dimensional technique) |
|:---:|:---:|:---:|:---:|
| $10^1$ | 5 | 2bit/photon | 2 times |
| $10^2$ | 50 | 5bit/photon | 5 times |
| $10^3$ | 500 | 8bit/photon | 8 times |
| $10^4$ | 5000 | 12bit/photon | 12 times |

FIG. 33

Time required for generating encoding
polarization state=SPD dead time T=(2N-1)τ

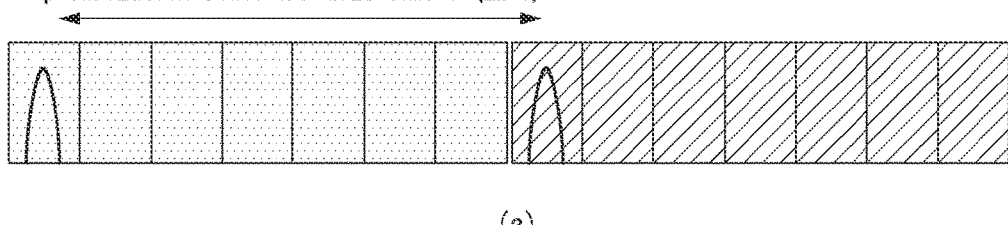

(a)

Time required for generating encoding
time state=(4N-3) τ ≈ 2T

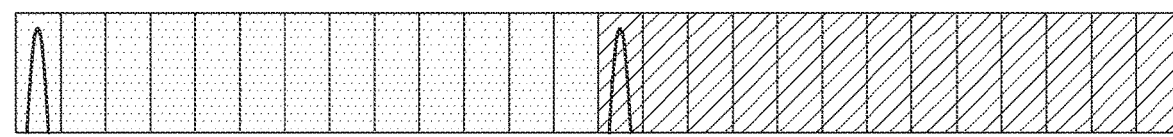

| Dimension k | Existing single photon based QSDC (Dead time based information transmission amount) | Proposed technique | Data rate improvement ratio (Compared to existing polarization based technique) | Others |
|---|---|---|---|---|
| 2 | Transmitting 1 bit of information every SPD dead time T regardless of dimensional increase through increase in light source generation speed=1bit/T | 0.5bit/T | 0.5 times | Area in which existing polarization based technique is efficient |
| 4 | | 1bit/T | 1 times | |
| 8 | | 1.5bits/T | 1.5 times | Area in which proposed technique is efficient |
| 16 | | 2bits/T | 2 times | |
| ⋮ | | ⋮ | ⋮ | |
| $2^t$ | | $\frac{t}{2}$bits/T | $\frac{t}{2}$ times | |

METHOD FOR PERFORMING QUANTUM SECURE DIRECT COMMUNICATION IN QUANTUM COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2021/009420, filed on Jul. 21, 2021. The disclosure of the prior application is incorporated by reference in its entirety.

TECHNICAL FIELD

The present disclosure relates to a quantum communication system, and more particularly, to a method for high-dimensional quantum secure direct communication in a quantum communication system, and an apparatus therefor.

BACKGROUND ART

Wireless communication systems have been widely deployed to provide various types of communication services such as voice or data. In general, the wireless communication system is a multiple access system capable of supporting communication with multiple users by sharing available system resources (bandwidth, transmission power, etc.). Examples of multiple access systems include a Code Division Multiple Access (CDMA) system, a Frequency Division Multiple Access (FDMA) system, a Time Division Multiple Access (TDMA) system, a Space Division Multiple Access (SDMA) system, an Orthogonal Frequency Division Multiple Access (OFDMA) system, a Single Carrier Frequency Division Multiple Access (SC-FDMA) system, and an Interleave Division Multiple Access (IDMA) system.

DISCLOSURE

Technical Problem

An object of the present disclosure is to provide a method for performing quantum secure direct communication in a quantum communication system, and an apparatus therefor.

Furthermore, an object of the present disclosure is to provide a method for transmitting 2 or more bits of classical information based on a single photon in a quantum communication system, and an apparatus therefor.

Furthermore, an object of the present disclosure is to provide a method for transmitting 2 or more bits of classical information without information loss based on a single photon in a quantum communication system, and an apparatus therefor.

Furthermore, an object of the present disclosure is to provide a method for constructing an initial state for information transmission by considering a dead time in a single photo detector of a receiving end in a quantum communication system, and an apparatus therefor.

The technical objects of the present disclosure are not limited to the aforementioned technical objects, and other technical objects, which are not mentioned above, will be apparently appreciated by a person having ordinary skill in the art from the following description.

Technical Solution

The present disclosure provides a method for performing quantum secure direct communication in a quantum communication system, and an apparatus therefor.

More specifically, according to the present disclosure, a quantum secure direct communication (QSDC) method by which a transmitting end transmits a message based on differential time coding, in a quantum communication system includes: receiving, from a receiving end on a quantum channel, (i) at least one initial time state configured by including a time interval equal to a dead time of a single photon detector of the receiving end and (ii) at least one initial phase state; receiving, from the receiving end on a classical channel, time state location information for selecting a specific initial time state for encoding of information transmitted to the receiving end; selecting the specific initial time state for the encoding, based on the time state location information: generating an encoding time state by encoding the information, based on the selected specific initial time state, wherein the encoding time state is generated by applying a time shift based on a value of the information being encoded; and transmitting a message including the encoding time state to the receiving end through the quantum channel, and the message is restored based on a differential time between information on the at least one initial time state information stored in the receiving end and information on the encoding time state.

Furthermore, according to the present disclosure, some initial time states and initial phase states among the at least one initial time state and the at least one initial phase state are used for determining whether there is a eavesdropping on the quantum channel for the at least one initial time state and the at least one initial phase state.

Furthermore, according to the present disclosure, the method further includes receiving, from the receiving end on the classical channel, information on the some initial time states and initial phase states used for determining whether there is the eavesdropping on the quantum channel.

Furthermore, according to the present disclosure, the method further includes determining whether there is the eavesdropping on the quantum channel based on quantum bit error rate (QBER) estimation, based on the information on the some initial time states and initial phase states.

Furthermore, according to the present disclosure, the method further includes requesting retransmission of an initial time state and an initial phase state based on a value of QBER being equal to or more than a specific value according to a result of determining whether there is the eavesdropping.

Furthermore, according to the present disclosure, selection and encoding of the specific initial time state is performed based on the value of QBER being smaller than the specific value according to the result of determining whether there is the eavesdropping.

Furthermore, according to the present disclosure, the receiving of the time state location information is performed after receiving (i) the at least one initial time state and (ii) the at least one initial phase state.

Furthermore, according to the present disclosure, the generating of the encoding time state further includes adding, to the information, a random number used for determining whether there is a eavesdropping in a backward quantum channel, and generating a codeword by encoding the information to which the random number is added.

Furthermore, according to the present disclosure, the method further includes transmitting, to the receiving end on the classical channel, random information including (i) a location of the random number and (ii) information on a value of the random number.

Furthermore, according to the present disclosure, e generating of the encoding time state further includes combining the specific initial time state and the codeword by applying the time shift to the codeword.

Furthermore, according to the present disclosure, different time shift values are applied to the encoding time state based on a value of the encoded information.

Furthermore, according to the present disclosure, the application of the different time shift values is performed based on a predefined mapping table, and the mapping table is related to a mapping relationship between the values of the encoded information and the time shift values.

Furthermore, according to the present disclosure, the specific initial time state and the encoding time state are configured by one or more time bins, and based on a dimension of the specific time state being the same as a dimension of the encoding time state, a length of the time bin constituting the specific initial time state is equal to a length of the time bin constituting the encoding time state.

Furthermore, according to the present disclosure, based on the dimension of the specific time state being different from the dimension of the encoding time state, the length of the time bin constituting the encoding time state is smaller than the length of the time bin constituting the specific initial time state.

Furthermore, according to the present disclosure, the method further includes transmitting, to the receiving end, information on a dimension applied to generation of the encoding time state before generating the encoding time state, based on the dimension of the specific time state being different from the dimension of the encoding time state.

Furthermore, according to the present disclosure, a transmitting end performing quantum secure direct communication (QSDC) for transmitting a message based on differential time coding, in a quantum communication system includes: a transmitter for transmitting a radio signal; a receiver for receiving the radio signal; at least one processor; and at least one computer memory operably connectable to the at least one processor, and storing instructions of performing operations when executed by the at least one processor, and the operations include receiving, from a receiving end on a quantum channel. (i) at least one initial time state configured by including a time interval equal to a dead time of a single photon detector of the receiving end; receiving, from the receiving end on a classical channel, time state location information for selecting a specific initial time state for encoding of information transmitted to the receiving end; selecting the specific initial time state for the encoding, based on the time state location information; generating an encoding time state by encoding the information, based on the selected specific initial time state; generating the encoding time state by applying a time shift based on a value of the information being encoded; and transmitting a message including the encoding time state to the receiving end through the quantum channel, and the message is restored based on a differential time between information on the at least one initial time state information stored in the receiving end and information on the encoding time state.

Furthermore, according to the present disclosure, a quantum secure direct communication (QSDC) method by which a receiving end receives a message based on differential time coding, in a quantum communication system includes: transmitting, to a transmitting end on a quantum channel, (i) at least one initial time state configured by including a time interval equal to a dead time of a single photon detector of the receiving end; transmitting, to the transmitting end on a classical channel, time state location information for selecting a specific initial time state for encoding of information transmitted to the transmitting end, wherein the specific initial time state for the encoding in the transmitting end is selected based on the time state location information; receiving, from the transmitting end, a message including an encoding time state generated by applying a time shift based on a value of the information encoded based on the specific initial time state; and restoring the information based on the at least one initial time state information and the encoding time state information stored in the receiving end.

Furthermore, according to the present disclosure, a receiving end performing quantum secure direct communication (QSDC) for receiving a message based on differential time coding, in a quantum communication system includes: a transmitter for transmitting a radio signal; a receiver for receiving the radio signal; at least one processor; and at least one computer memory operably connectable to the at least one processor, and storing instructions of performing operations when executed by the at least one processor, and the operations include transmitting, to a transmitting end on a quantum channel, (i) at least one initial time state configured by including a time interval equal to a dead time of a single photon detector of the receiving end; transmitting, to the transmitting end on a classical channel, time state location information for selecting a specific initial time state for encoding of information transmitted to the transmitting end; wherein the specific initial time state for the encoding in the transmitting end is selected based on the time state location information: receiving, from the transmitting end, a message including an encoding time state generated by applying a time shift based on a value of the information encoded based on the specific initial time state; and restoring the information based on the at least one initial time state information and the encoding time state information stored in the receiving end.

Furthermore, according to the present disclosure, in a non-transitory computer readable medium (CRM) storing one or more instructions, one or more instructions executable by one or more processors control a transmitting end to receive, from a receiving end on a quantum channel. (i) at least one initial time state configured by including a time interval equal to a dead time of a single photon detector of the receiving end; receive, from the receiving end on a classical channel, time state location information for selecting a specific initial time state for encoding of information transmitted to the receiving end; select the specific initial time state for the encoding, based on the time state location information; generate an encoding time state by encoding the information, based on the selected specific initial time state, wherein the encoding time state is generated by applying a time shift based on a value of the information being encoded; and transmit a message including the encoding time state to the receiving end through the quantum channel, and the message is restored based on a differential time between information on the at least one initial time state information stored in the receiving end and information on the encoding time state.

Furthermore, according to the present disclosure, an apparatus includes: one or more memories and one or more processors functionally connected to the one or more memories, and the one or more processors control the apparatus to receive, from a receiving end on a quantum channel, (i) at least one initial time state configured by including a time interval equal to a dead time of a single photon detector of the receiving end; receive, from the receiving end on a classical channel, time state location information for selecting a specific initial time state for encoding of information transmitted to the receiving end; select the specific initial time state for the encoding, based on the time state location information; generate an encoding time state by encoding the information, based on the selected specific initial time state, wherein the encoding time state is generated by applying a time shift based on a value of the information being encoded; and transmit a message including the encoding time state to the receiving end through the quantum channel, and wherein the message is restored based on a differential time between information on the at least one initial time state information stored in the receiving end and information on the encoding time state.

Advantageous Effects

According to the present disclosure, there is an effect in that quantum secure direct communication can be performed in a quantum communication system.

Furthermore, according to the present disclosure, there is an effect in that a data rate in the quantum communication system can be improved by transmitting 2 or more bits of classical information based on a single photon.

Furthermore, according to the present disclosure, there is an effect in that 2 or more bits of classical information can be transmitted without information loss based on the single photon in the quantum communication system.

Furthermore, there is an effect in that an initial state for information transmission is configured by considering a dead time in a single photo detector of a receiving end in the quantum communication system to minimize information loss in the receiving end.

Advantages which can be obtained in the present disclosure are not limited to the aforementioned effects and other unmentioned effects will be clearly understood by those skilled in the art from the following description.

DESCRIPTION OF DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

FIG. 4 is a view showing another example of a wireless device applicable to the present disclosure.

FIG. 19 is a view showing an example of an N-dimensional phase state generation method proposed by the present disclosure.

FIG. 20 is a view showing an example of a generation process of a phase state.

FIG. 24 is a view showing an example of a time state and a phase state generated by the generation method of the time state and the phase state proposed by the present disclosure.

FIG. 29 is a view showing an example of a rule of encoding a message through time delay allocation using N delay lines having different lengths in the initial time state.

FIG. 31 is a view showing an example of a method for estimating QBER in a reverse quantum channel proposed by the present disclosure.

FIG. 32 is a view showing a transmission volume improvement effect for a case of generating high-dimensional quantum information by a scheme of increasing a signal generation speed of a light source compared to a maximum detection speed of an SPD.

FIG. 33 is a view showing an example of a quantum state generation time in the existing quantum information transmission technique and the method proposed by the present disclosure.

FIG. 34 is a view a result of comparing an improvement effect in terms of a data rate of an invented technique according to an increase in dimension with a data rate in an existing QSDC technique.

MODE FOR DISCLOSURE

Figure 1:
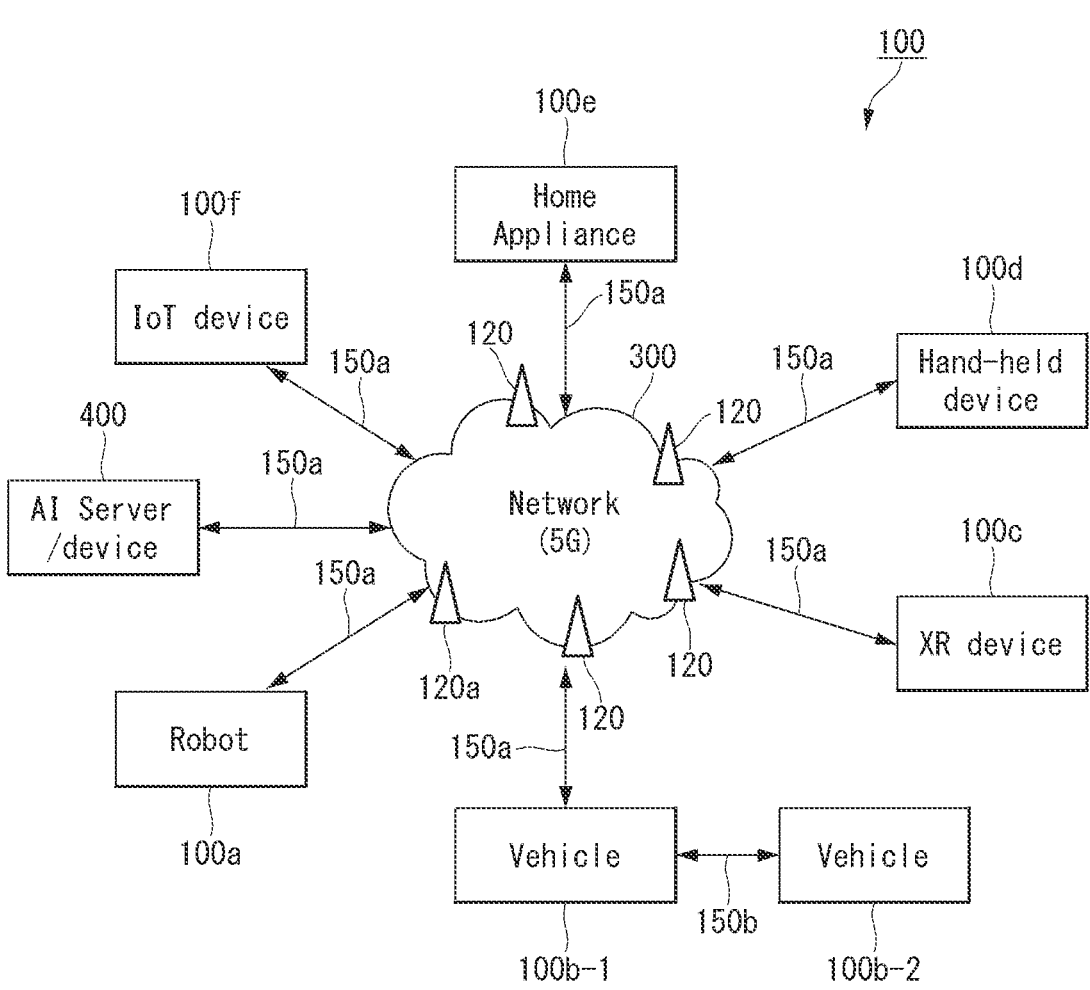
FIG. 1 is a view showing an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an UpLink (UL). Likewise, the mobile station may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5th generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure. Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 100g through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Communication System Applicable to the Present Disclosure

Figure 2:
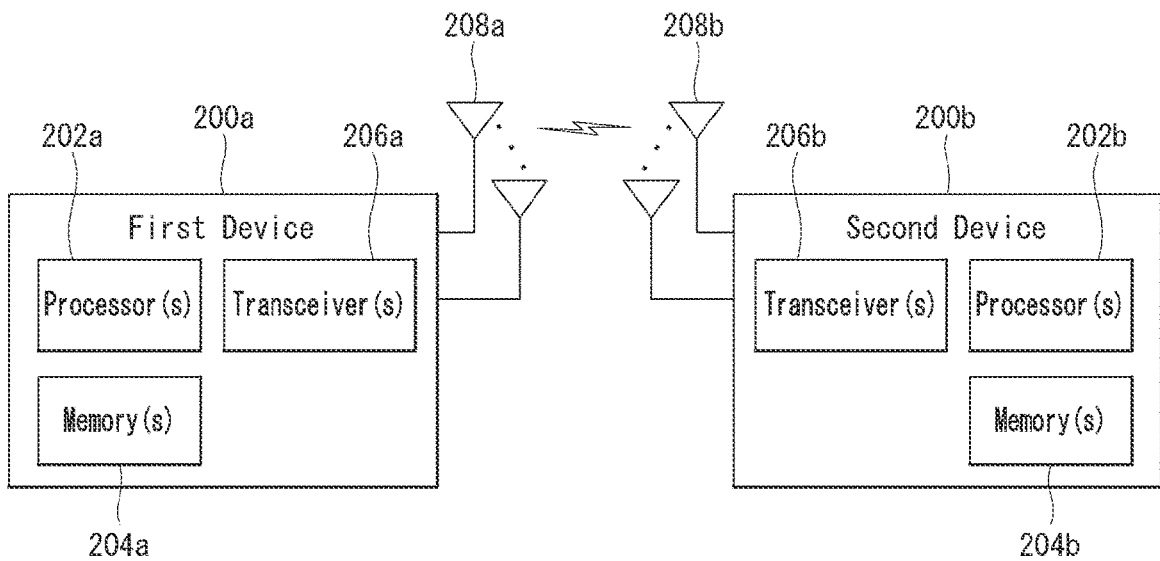
FIG. 2 is a view showing an example of a wireless apparatus applicable to the present disclosure.

FIG. 2 is a view showing an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be connected with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be connected with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206b and to implement the descriptions, functions, procedures, proposals, methods and/or operational flowcharts disclosed herein. For example, the processor 202b may process information in the memory 204b to generate third information/signal and then transmit the third information/signal through the transceiver 206b. In addition, the processor 202b may receive a radio signal including fourth information/signal through the transceiver 206b and then store information obtained from signal processing of the fourth information/signal in the memory 204*b*. The memory 204*b* may be connected with the processor 202*b* to store a variety of information related to operation of the processor 202*b*. For example, the memory 204*b* may store software code including instructions for performing all or some of the processes controlled by the processor 202*b* or performing the descriptions, functions, procedures, proposals, methods and/or operational flowcharts disclosed herein. Herein, the processor 202*b* and the memory 204*b* may be part of a communication modem/circuit/chip designed to implement wireless communication technology (e.g., LTE or NR). The transceiver 206*b* may be connected with the processor 202*b* to transmit and/or receive radio signals through one or more antennas 208*b*. The transceiver 206*b* may include a transmitter and/or a receiver. The transceiver 206*b* may be used interchangeably with a radio frequency (RF) unit. In the present disclosure, the wireless device may refer to a communication modem/circuit/chip.

Hereinafter, hardware elements of the wireless devices 200*a* and 200*b* will be described in greater detail. Without being limited thereto, one or more protocol layers may be implemented by one or more processors 202*a* and 202*b*. For example, one or more processors 202*a* and 202*b* may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202*a* and 202*b* may generate one or more protocol data units (PDUs) and/or one or more service data unit (SDU) according to the descriptions, functions, procedures, proposals, methods and/or operational flowcharts disclosed herein. One or more processors 202*a* and 202*b* may generate messages, control information, data or information according to the descriptions, functions, procedures, proposals, methods and/or operational flowcharts disclosed herein. One or more processors 202*a* and 202*b* may generate PDUs, SDUs, messages, control information, data or information according to the functions, procedures, proposals and/or methods disclosed herein and provide the PDUs, SDUs, messages, control information, data or information to one or more transceivers 206*a* and 206*b*. One or more processors 202*a* and 202*b* may receive signals (e.g., baseband signals) from one or more transceivers 206*a* and 206*b* and acquire PDUs, SDUs, messages, control information, data or information according to the descriptions, functions, procedures, proposals, methods and/or operational flowcharts disclosed herein.

One or more processors 202*a* and 202*b* may be referred to as controllers, microcontrollers, microprocessors or microcomputers. One or more processors 202*a* and 202*b* may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202*a* and 202*b*. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202*a* and 202*b* or stored in one or more memories 204*a* and 204*b* to be driven by one or more processors 202*a* and 202*b*. The descriptions, functions, procedures, proposals, methods and/or operational flowcharts disclosed herein implemented using firmware or software in the form of code, a command and/or a set of commands.

One or more memories 204*a* and 204*b* may be connected with one or more processors 202*a* and 202*b* to store various types of data, signals, messages, information, programs, code, instructions and/or commands. One or more memories 204*a* and 204*b* may be composed of read only memories (ROMs), random access memories (RAMs), erasable programmable read only memories (EPROMs), flash memories, hard drives, registers, cache memories, computer-readable storage mediums and/or combinations thereof. One or more memories 204*a* and 204*b* may be located inside and/or outside one or more processors 202*a* and 202*b*. In addition, one or more memories 204*a* and 204*b* may be connected with one or more processors 202*a* and 202*b* through various technologies such as wired or wireless connection.

One or more transceivers 206*a* and 206*b* may transmit user data, control information, radio signals/channels, etc. described in the methods and/or operational flowcharts of the present disclosure to one or more other apparatuses. One or more transceivers 206*a* and 206*b* may receive user data, control information, radio signals/channels, etc. described in the methods and/or operational flowcharts of the present disclosure from one or more other apparatuses. For example, one or more transceivers 206*a* and 206*b* may be connected with one or more processors 202*a* and 202*b* to transmit/receive radio signals. For example, one or more processors 202*a* and 202*b* may perform control such that one or more transceivers 206*a* and 206*b* transmit user data, control information or radio signals to one or more other apparatuses. In addition, one or more processors 202*a* and 202*b* may perform control such that one or more transceivers 206*a* and 206*b* receive user data, control information or radio signals from one or more other apparatuses. In addition, one or more transceivers 206*a* and 206*b* may be connected with one or more antennas 208*a* and 208*b*, and one or more transceivers 206*a* and 206*b* may be configured to transmit/receive user data, control information, radio signals/channels, etc. described in the descriptions, functions, procedures, proposals, methods and/or operational flowcharts disclosed herein through one or more antennas 208*a* and 208*b*. In the present disclosure, one or more antennas may be a plurality of physical antennas or a plurality of logical antennas (e.g., antenna ports). One or more transceivers 206*a* and 206*b* may convert the received radio signals/channels, etc. from RF band signals to baseband signals, in order to process the received user data, control information, radio signals/channels, etc. using one or more processors 202*a* and 202*b*. One or more transceivers 206*a* and 206*b* may convert the user data, control information, radio signals/channels processed using one or more processors 202*a* and 202*b* from baseband signals into RF band signals. To this end, one or more transceivers 206*a* and 206*b* may include (analog) oscillator and/or filters.

Figure 3:
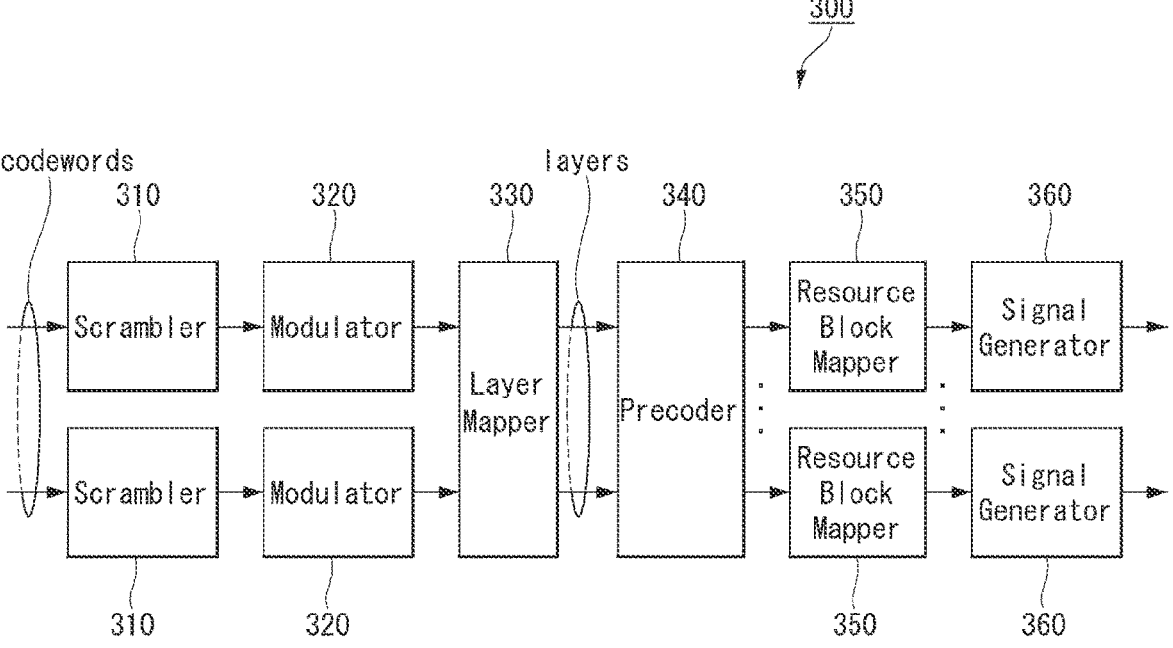
FIG. 3 is a view showing a method of processing a transmitted signal applicable to the present disclosure.

FIG. 3 is a view showing a method of processing a transmitted signal applicable to the present disclosure. For example, the transmitted signal may be processed by a signal processing circuit. At this time, a signal processing circuit 1200 may include a scrambler 300, a modulator 320, a layer mapper 330, a precoder 340, a resource mapper 350, and a signal generator 360. At this time, for example, the operation/function of FIG. 3 may be performed by the processors 202*a* and 202*b* and/or the transceiver 206*a* and 206*b* of FIG. 2. In addition, for example, the hardware element of FIG. 3 may be implemented in the processors 202a and 202b of FIG. 2 and/or the transceivers 206a and 206b of FIG. 2. In addition, for example blocks 310 to 350 may be implemented in the processors 202a and 202b of FIG. 2 and a block 360 may be implemented in the transceivers 206a and 206b of FIG. 2, without being limited to the above-described embodiments.

Figure 6:
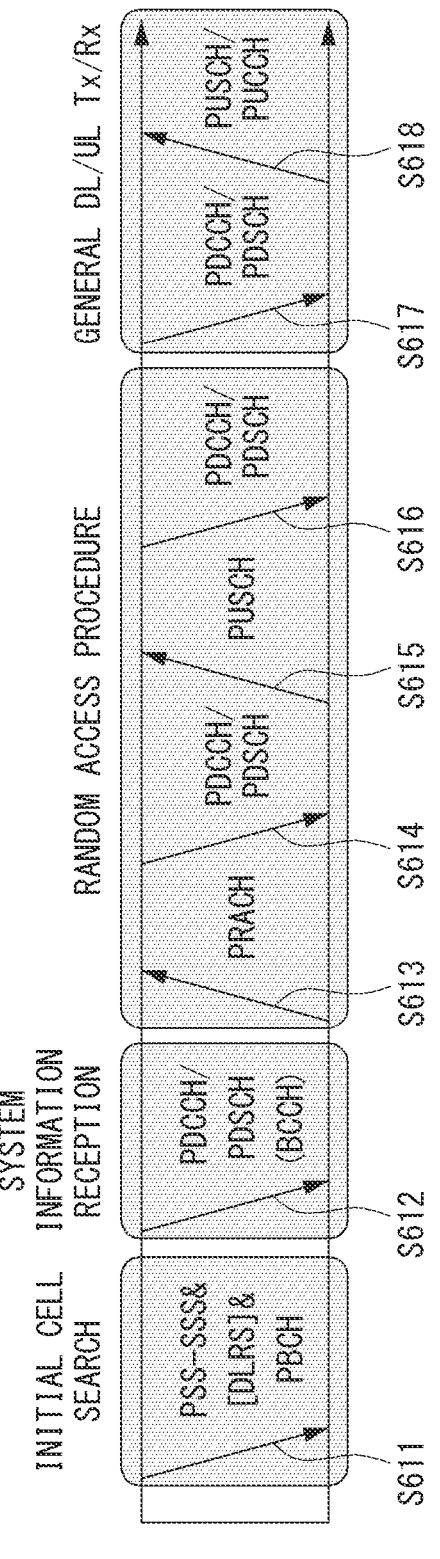
FIG. 6 is a view showing physical channels applicable to the present disclosure and a signal transmission method using the same.

A codeword may be converted into a radio signal through the signal processing circuit 300 of FIG. 3. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 6. Specifically, the codeword may be converted into a bit sequence scrambled by the scrambler 310. The scramble sequence used for scramble is generated based in an initial value and the initial value may include ID information of a wireless device, etc. The scrambled bit sequence may be modulated into a modulated symbol sequence by the modulator 320. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 330. Modulation symbols of each transport layer may be mapped to corresponding antenna port(s) by the precoder 340 (precoding). The output z of the precoder 340 may be obtained by multiplying the output y of the layer mapper 330 by an N*M precoding matrix W. Here, N may be the number of antenna ports and M may be the number of transport layers. Here, the precoder 340 may perform precoding after transform precoding (e.g., discrete Fourier transform (DFT)) for complex modulation symbols. In addition, the precoder 340 may perform precoding without performing transform precoding.

The resource mapper 350 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 360 may generate a radio signal from the mapped modulation symbols, and the generated radio signal may be transmitted to another device through each antenna. To this end, the signal generator 360 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 310 to 360 of FIG. 3. For example, the wireless device (e.g., 200a or 200b of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

Structure of Wireless Device Applicable to the Present Disclosure

FIG. 4 is a view showing another example of a wireless device applicable to the present disclosure.

Referring to FIG. 4, a wireless device 400 may correspond to the wireless devices 200a and 200b of FIG. 2 and include various elements, components, units/portions and/or modules. For example, the wireless device 400 may include a communication unit 410, a control unit (controller) 420, a memory unit (memory) 430 and additional components 440. The communication unit may include a communication circuit 412 and a transceiver(s) 414. For example, the communication circuit 412 may include one or more processors 202a and 202b and/or one or more memories 204a and 204b of FIG. 2. For example, the transceiver(s) 414 may include one or more transceivers 206a and 206b and/or one or more antennas 208a and 208b of FIG. 2. The control unit 420 may be electrically connected with the communication unit 410, the memory unit 430 and the additional components 440 to control overall operation of the wireless device. For example, the control unit 320 may control electrical/mechanical operation of the wireless device based on program/code/instruction/information stored in the memory unit 430. In addition, the control unit 420 may transmit the information stored in the memory unit 430 to the outside (e.g., another communication device) through the wireless/wired interface using the communication unit 410 over a wireless/wired interface or store information received from the outside (e.g., another communication device) through the wireless/wired interface using the communication unit 410 in the memory unit 430.

The additional components 440 may be variously configured according to the types of the wireless devices. For example, the additional components 440 may include at least one of a power unit/battery, an input/output unit, a driving unit or a computing unit. Without being limited thereto, the wireless device 400 may be implemented in the form of the robot (FIG. 1, 100a), the vehicles (FIGS. 1, 100b-1 and 100b-2), the XR device (FIG. 1, 100c), the hand-held device (FIG. 1, 100d), the home appliance (FIG. 1, 100e), the IoT device (FIG. 1, 100f), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 4, various elements, components, units/portions and/or modules in the wireless device 400 may be connected with each other through wired interfaces or at least some thereof may be wirelessly connected through the communication unit 410. For example, in the wireless device 400, the control unit 420 and the communication unit 410 may be connected by wire, and the control unit 420 and the first unit (e.g., 130 or 140) may be wirelessly connected through the communication unit 410. In addition, each element, component, unit/portion and/or module of the wireless device 400 may further include one or more elements. For example, the control unit 420 may be composed of a set of one or more processors. For example, the control unit 420 may be composed of a set of a communication control processor, an application processor, an electronic control unit (ECU), a graphic processing processor, a memory control processor, etc. In another example, the memory unit 430 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

Figure 5:
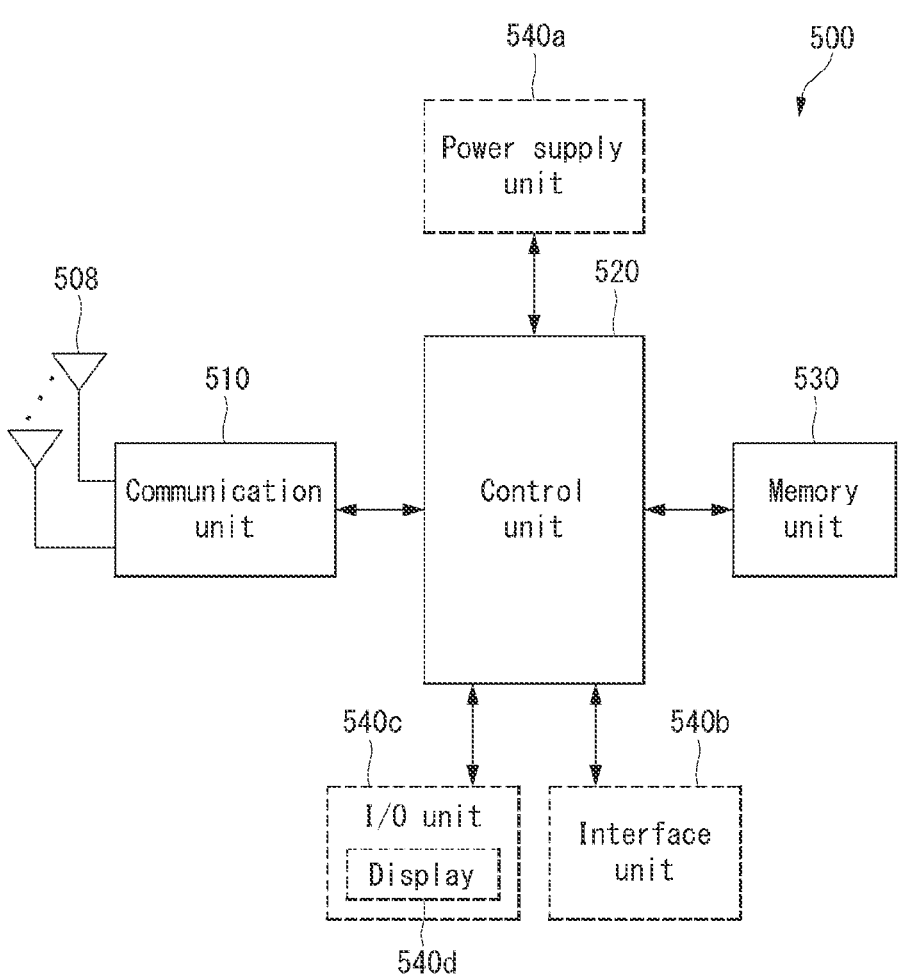
FIG. 5 is a view showing an example of a hand-held device applicable to the present disclosure.

FIG. 5 is a view showing an example of a hand-held device applicable to the present disclosure.

FIG. 5 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 5, the hand-held device 500 may include an antenna unit (antenna) 508, a communication unit (transceiver) 510, a control unit (controller) 520, a memory unit (memory) 530, a power supply unit (power supply) 540*a*, an interface unit (interface) 540*b*, and an input/output unit 540*c*. An antenna unit (antenna) 508 may be part of the communication unit 510. The blocks 510 to 530/540*a* to 540*c* may correspond to the blocks 410 to 430/440 of FIG. 4, respectively.

The communication unit 510 may transmit and receive signals (e.g., data, control signals, etc.) to and from other wireless devices or base stations. The control unit 520 may control the components of the hand-held device 500 to perform various operations. The control unit 520 may include an application processor (AP). The memory unit 530 may store data/parameters/program/code/instructions necessary to drive the hand-held device 500. In addition, the memory unit 430 may store input/output data/information, etc. The power supply unit 540*a* may supply power to the hand-held device 500 and include a wired/wireless charging circuit, a battery, etc. The interface unit 540*b* may support connection between the hand-held device 500 and another external device. The interface unit 540*b* may include various ports (e.g., an audio input/output port and a video input/output port) for connection with the external device. The input/output unit 440*c* may receive or output video information/signals, audio information/signals, data and/or user input information. The input/output unit 540*c* may include a camera, a microphone, a user input unit, a display 540*d*, a speaker and/or a haptic module.

For example, in case of data communication, the input/output unit 540*c* may acquire user input information/signal (e.g., touch, text, voice, image or video) from the user and store the user input information/signal in the memory unit 530. The communication unit 510 may convert the information/signal stored in the memory into a radio signal and transmit the converted radio signal to another wireless device directly or transmit the converted radio signal to a base station. In addition, the communication unit 510 may receive a radio signal from another wireless device or the base station and then restore the received radio signal into original information/signal. The restored information/signal may be stored in the memory unit 530 and then output through the input/output unit 540*c* in various forms (e.g., text, voice, image, video and haptic).

Physical Channels and General Signal Transmission

In a radio access system, a UE receives information from a base station on a DL and transmits information to the base station on a UL. The information transmitted and received between the UE and the base station includes general data information and a variety of control information. There are many physical channels according to the types/usages of information transmitted and received between the base station and the UE.

FIG. 5 is a view showing physical channels applicable to the present disclosure and a signal transmission method using the same.

The UE which is turned on again in a state of being turned off or has newly entered a cell performs initial cell search operation in step S1011 such as acquisition of synchronization with a base station. Specifically, the UE performs synchronization with the base station, by receiving a Primary Synchronization Channel (P-SCH) and a Secondary Synchronization Channel (S-SCH) from the base station, and acquires information such as a cell Identifier (ID).

Thereafter, the UE may receive a physical broadcast channel (PBCH) signal from the base station and acquire intra-cell broadcast information. Meanwhile, the UE may receive a downlink reference signal (DL RS) in an initial cell search step and check a downlink channel state. The UE which has completed initial cell search may receive a physical downlink control channel (PDCCH) and a physical downlink control channel (PDSCH) according to physical downlink control channel information in step S612, thereby acquiring more detailed system information.

Thereafter, the UE may perform a random access procedure such as steps S613 to S616 in order to complete access to the base station. To this end, the UE may transmit a preamble through a physical random access channel (PRACH) (S613) and receive a random access response (RAR) to the preamble through a physical downlink control channel and a physical downlink shared channel corresponding thereto (S614). The UE may transmit a physical uplink shared channel (PUSCH) using scheduling information in the RAR (S615) and perform a contention resolution procedure such as reception of a physical downlink control channel signal and a physical downlink shared channel signal corresponding thereto (S616).

The UE, which has performed the above-described procedures, may perform reception of a physical downlink control channel signal and/or a physical downlink shared channel signal (S617) and transmission of a physical uplink shared channel (PUSCH) signal and/or a physical uplink control channel (PUCCH) signal (S618) as general uplink/downlink signal transmission procedures.

The control information transmitted from the UE to the base station is collectively referred to as uplink control information (UCI). The UCI includes hybrid automatic repeat and request acknowledgement/negative-ACK (HARQ-ACK/NACK), scheduling request (SR), channel quality indication (CQI), precoding matrix indication (PMI), rank indication (RI), beam indication (BI) information, etc. At this time, the UCI is generally periodically transmitted through a PUCCH, but may be transmitted through a PUSCH in some embodiments (e.g., when control information and traffic data are simultaneously transmitted). In addition, the UE may aperiodically transmit UCI through a PUSCH according to a request/instruction of a network.

Figure 7:
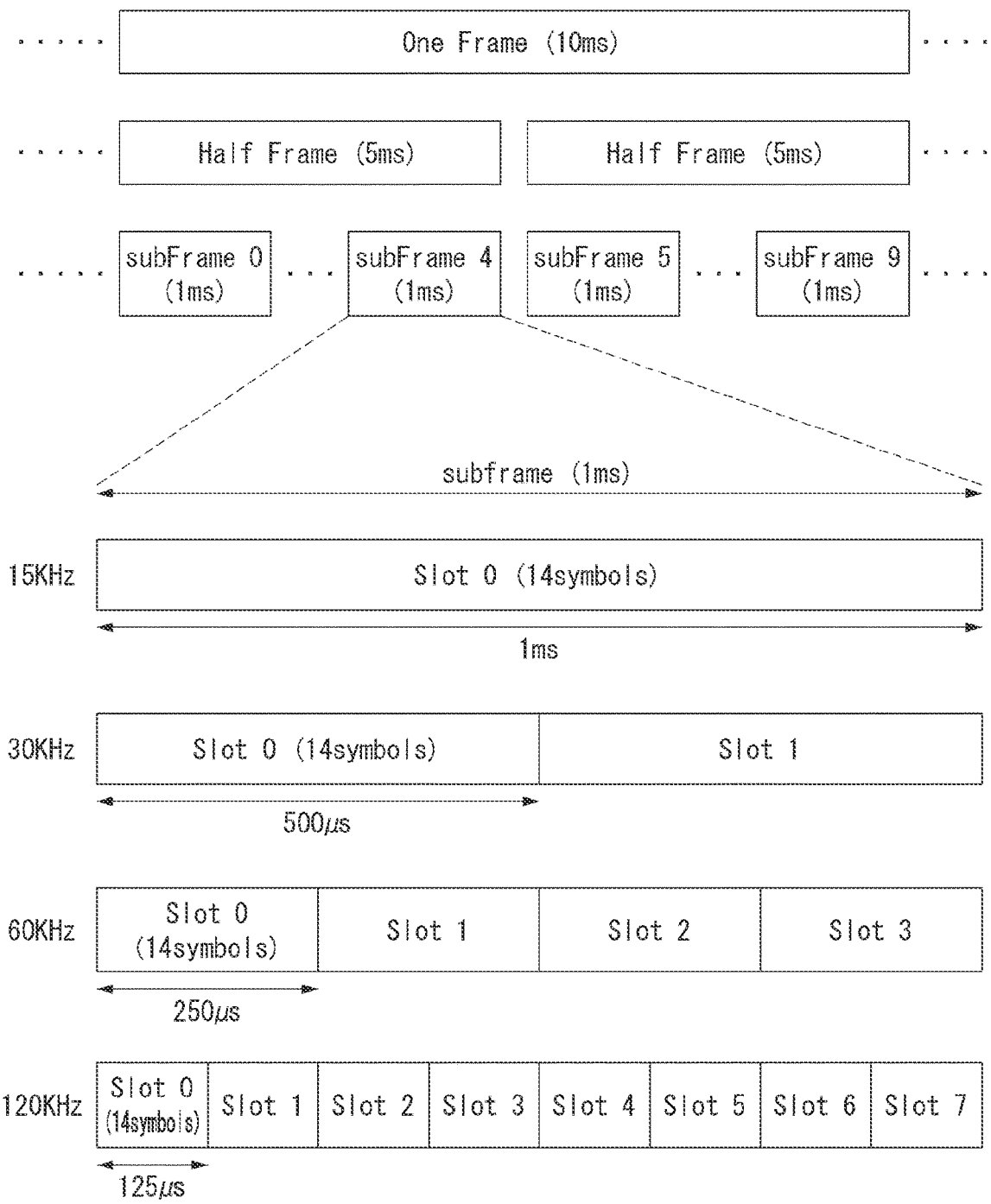
FIG. 7 is a view showing the structure of a radio frame applicable to the present disclosure.

FIG. 7 is a view showing the structure of a radio frame applicable to the present disclosure.

UL and DL transmission based on an NR system may be based on the frame shown in FIG. 7. At this time, one radio frame has a length of 10 ms and may be defined as two 5-ms half-frames (HFs). One half-frame may be defined as five 1-ms subframes (SFs). One subframe may be divided into one or more slots and the number of slots in the subframe may depend on subscriber spacing (SCS). At this time, each slot may include 12 or 14 OFDM(A) symbols according to cyclic prefix (CP). If normal CP is used, each slot may include 14 symbols. If an extended CP is used, each slot may include 12 symbols. Here, the symbol may include an OFDM symbol (or a CP-OFDM symbol) and an SC-FDMA symbol (or a DFT-s-OFDM symbol).

Table 1 shows the number of symbols per slot according to SCS, the number of slots per frame and the number of slots per subframe when normal CP is used, and Table 2 shows the number of symbols per slot according to SCS, the number of slots per frame and the number of slots per subframe when extended CP is used.

TABLE 1

| 5 | 14 | 320 | 32 |
|---|----|-----|----|

TABLE 2

| 2 | 12 | 40 | 4 |
|---|----|----|---|

In Tables 1 and 2 above, Nslotsymb may indicate the number of symbols in a slot, Nframe,µslot may indicate the number of slots in a frame, and Nsubframe,µslot may indicate the number of slots in a subframe.

In addition, in a system, to which the present disclosure is applicable, OFDM(A) numerology (e.g., SCS, CP length, etc.) may be differently set among a plurality of cells merged to one UE. Accordingly, an (absolute time) period of a time resource (e.g., an SF, a slot or a TTI) (for convenience, collectively referred to as a time unit (TU)) composed of the same number of symbols may be differently set between merged cells.

NR may support a plurality of numerologies (or subscriber spacings (SCSs)) supporting various 5G services. For example, a wide area in traditional cellular bands is supported when the SCS is 15 kHz, dense-urban, lower latency and wider carrier bandwidth are supported when the SCS is 30 kHz/60 kHz, and bandwidth greater than 24.25 GHz may be supported to overcome phase noise when the SCS is 60 kHz or higher.

An NR frequency band is defined as two types (FR1 and FR2) of frequency ranges. FR1 and FR2 may be configured as shown in the following table. In addition, FR2 may mean millimeter wave (mmW).

TABLE 3

| FR1 | 410 MHz-7125 MHz | 15, 30, 60 kHz |
|-----|-------------------|-----------------|
| FR2 | 24250 MHz-52600 MHz | 60, 120, 240 kHz |

In addition, for example, in a communication system, to which the present disclosure is applicable, the above-described numerology may be differently set. For example, a terahertz wave (THz) band may be used as a frequency band higher than FR2. In the THz band, the SCS may be set greater than that of the NR system, and the number of slots may be differently set, without being limited to the above-described embodiments. The THz band will be described below.

Figure 8:
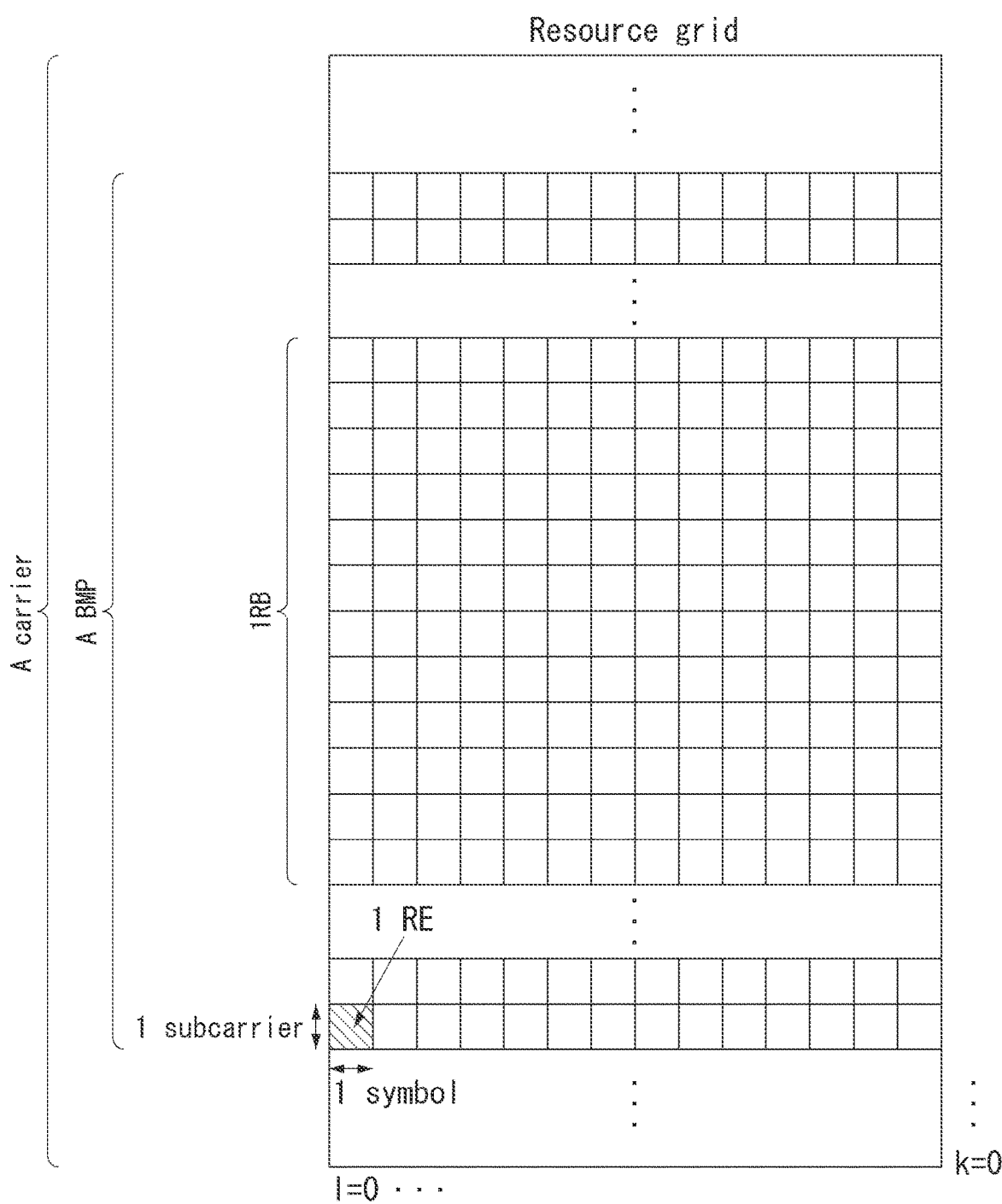
FIG. 8 is a view showing a slot structure applicable to the present disclosure.

FIG. 8 is a view showing a slot structure applicable to the present disclosure.

One slot includes a plurality of symbols in the time domain. For example, one slot includes seven symbols in case of normal CP and one slot includes six symbols in case of extended CP. A carrier includes a plurality of subcarriers in the frequency domain. A resource block (RB) may be defined as a plurality (e.g., 12) of consecutive subcarriers in the frequency domain.

In addition, a bandwidth part (BWP) is defined as a plurality of consecutive (P)RBs in the frequency domain and may correspond to one numerology (e.g., SCS, CP length, etc.).

The carrier may include a maximum of N (e.g., five) BWPs. Data communication is performed through an activated BWP and only one BWP may be activated for one UE. In resource grid, each element is referred to as a resource element (RE) and one complex symbol may be mapped.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 4

| Haptic Communication | Fully |
|----------------------|-------|

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 9:
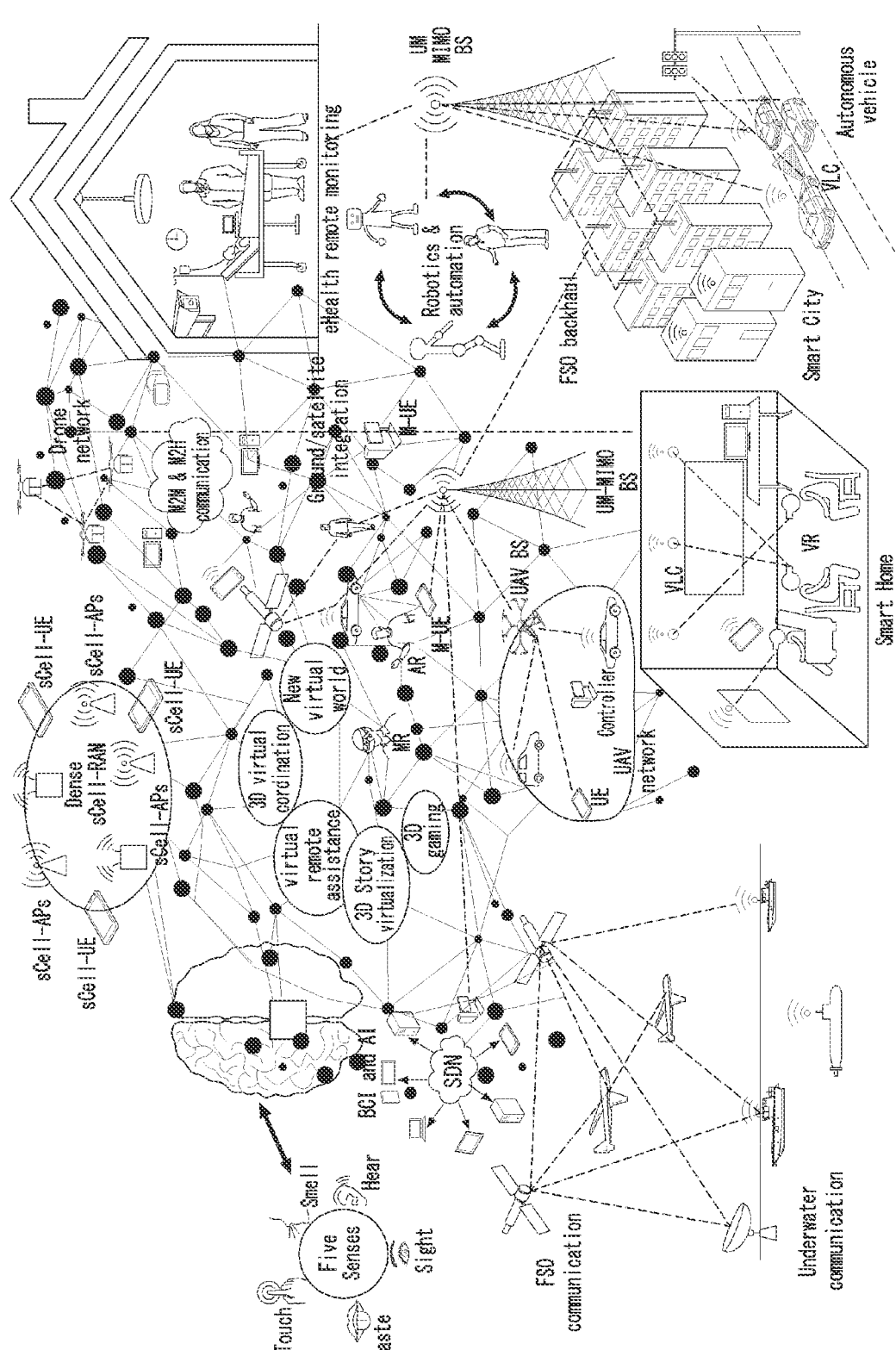
FIG. 9 is a view showing an example of a communication structure providable in a 6G system applicable to the present disclosure.

FIG. 9 is a view showing an example of a communication structure providable in a 6G system applicable to the present disclosure.

Referring to FIG. 9, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimemtion connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Quantum Communication

In the context of 6G networks, unsupervised reinforcement learning of networks is promising. A supervised learning method may not label the massive amounts of data generated by 6G. The unsupervised learning does not require labeling. Therefore, this technique may be used to autonomously build representations of complex networks. Combining reinforced learning and unsupervised learning allows the network to operate in a truly autonomous scheme.

Definition of Terms

For convenience of description, the following symbols/abbreviations/terms may be used interchangeably in the present disclosure.

QSDC: Quantum Secure Direct Communication
QBER: Quantum Bit Error Rate
QKD: Quantum Key Distribution
OSW: Optical Switch
LD: Laser Diode
SPD: Single Photon Detector
AWG: Arbitrary Waveform Generator
IM: Intensity modulator
PM: Phase Modulator
VOA: Variable Optical Attenuator
MZI: Mach-Zehnder Interferometer In a quantum information transmission system, the transmitting end mainly generates a quantum state to be transmitted based on the properties (characteristics) of the photon, attenuates the signal to the level of a single photon through an attenuator (VOA), and transmits the signal to the receiving end over a quantum channel. Here, the properties (characteristics) of the photon may include polarization, phase, time information, etc. The receiving end detects the signal transmitted by the transmitting end with the single photon detector (SPD). At this time, the information transmitted through the photon may not be detected at the receiving end due to various factors and loss may occur. The various factors may include loss due to channel, low measurement accuracy of the SPD, etc.

In particular, when a signal generation speed in the light source LD exceeds the maximum signal detection speed in the detector, the loss of the received signal may further increase. Such loss of the received signal may occur due to a dead time, which is the time required for the SPD to return to a ready state for detecting the next signal (photon) after detecting a signal at a specific time. More specifically, the dead time refers to a time when numerous electrons and holes are generated and emitted due to light entering, avalanche breakdown based on the generation and emission of the electrons and holes occurs, and then the power of the detector is cut off, and no signal received by the SPD is detected during recharging.

Figures 10, 11:
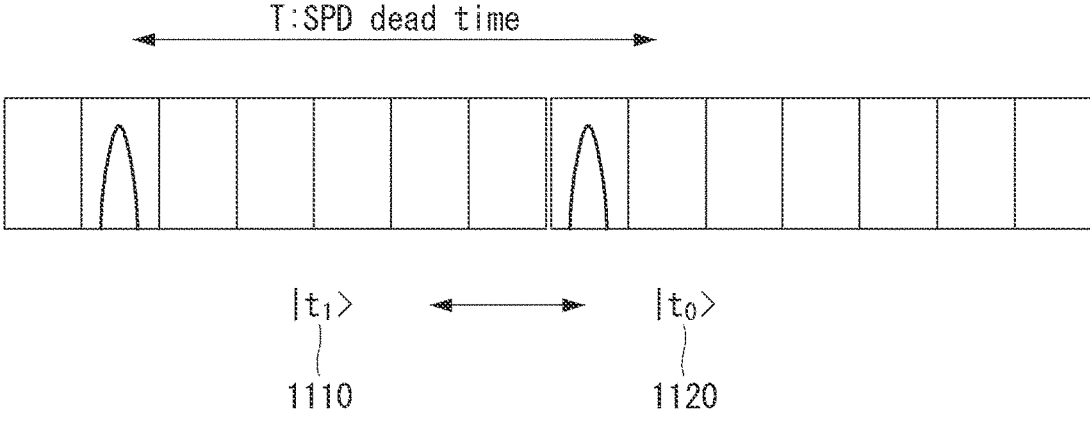
FIG. 10 is a view showing a performance comparison result of various types of commercial SPDs.
FIGS. 11 to 13 are diagrams to help understand a problem that when a high-dimensional quantum information transmission technique using a time state and a phase state is applied to QSDC, the detection efficiency of the time state and the phase state decreases as the dimension of transmission information increases.

FIG. 10 is a diagram showing a performance comparison result of various types of commercial SPDs. Referring to reference numeral 1010 in FIG. 10, it can be seen that a dead time of at least several tens of ns or more is consumed based on a commercial SPD. Due to this dead time, the maximum transmission speed of quantum information transmission techniques, including the QKD, currently remains at an Mbps unit, which is lower than that of existing communication technologies.

Considering that the speed at which optical quantum information can be generated in the LD is equal to or less than 1 ps, it can be seen that the quantum information generation speed in the LD is 104 times equal to or more than the maximum detection speed of the SPD. Due to the dead time of the SPD, in quantum communication technology, high-speed quantum information generation technology may be applied only in a range within the maximum detection speed of the SPD. As a result, there is a data rate limitation problem in quantum communication technology, and the data rate limitation problem may be solved by applying a method to which high-speed light source generation technology is applicable even in a situation where the SPD dead time exists.

Since the existing single-photon-based QSDC technique can transmit only 1 bit of classical information per photon, the data rate in the single-photon-based QSDC technique cannot be improved beyond a data rate corresponding to the dead time of the SPD. Research on the QSDC technique has been conducted using polarization coding based on a single-photon light source since the early 2000s, but the information transmission speed was reported to be lower than the QKD technique, a related quantum information transmission technology. One of the main reasons that the QSDC technique has a lower information transmission speed compared to the QKD technique is that classical information of 1 bit or more per photon may not be transmitted in the QSDC technique because the high-dimensional quantum information transmission technique, which is a technique used to improve the transmission speed in the QKD technique, may not be applied to the QSDC. The high-dimensional quantum information transmission technique is a data rate improvement technique that transmits 2 bits or more of classical information in one photon, and is known to be configurable in several methods.

In the present disclosure, the QSDC technique is handled, which is one of the quantum communication techniques that directly transmit the quantum information to the quantum channel. More specifically, the present disclosure proposes a method to improve the transmission efficiency of the QSDC through a high-dimensional quantum information transmission technique using the time state and the phase state among the high-dimensional quantum information transmission techniques.

For high-dimensional information transmission in a QKD protocol, which is used as a secret key sharing technique in quantum cryptographic communication, there is a case where a high-dimensional quantum information transmission technique using the time state and the phase state is applied. Even when the high-dimensional quantum information transmission technique using the time state and the phase state is applied to transmit high-dimensional information in the QKD protocol, there may be a problem of low detection efficiency. Nevertheless, if only the quantum secret key is shared between the transmitting end and the receiving end, low detection efficiency is only a factor that reduces the key rate in the QKD, so the high-dimensional quantum information transmission technique using the time state and the phase state may be used as quantum key distribution technology. On the other hand, the QSDC, which is the quantum communication technique, aims to accurately transmit message information. Therefore, to this end, a loss ratio during a detection process of transmitted information must be minimized. However, it is known that when the high-dimensional quantum information transmission technique using the time state and the phase state is applied to the QSDC, the detection efficiency of the time state and the phase state decreases as the dimension of transmission information increases.

The reason why when the high-dimensional quantum information transmission technique using the time state and the phase state is applied to the QSDC, the detection efficiency of the time state and the phase state decreases as the dimension of transmission information increases will be described in more detail with reference to FIGS. 11 to 13.

Figures 12, 13:
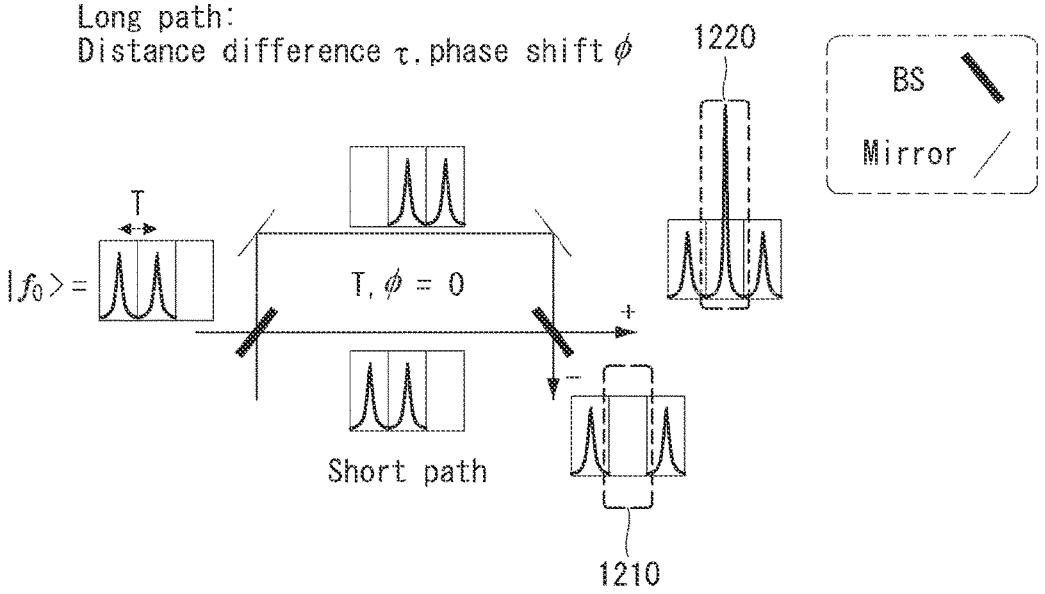

FIGS. 11 to 13 are diagrams to help understand a problem that when a high-dimensional quantum information transmission technique using a time state and a phase state is applied to QSDC, the detection efficiency of the time state and the phase state decreases as the dimension of transmission information increases.

More specifically, FIG. 11 is a view a diagram showing a case where high-dimensional quantum information is transmitted using the time state. Referring to FIG. 11, it can be seen that since a time interval between signals 1110 and 1120 transmitted from the transmitting end is shorter than the dead time in the SPD, the signal 1120 transmitted later is not detected in the SPD.

FIG. 13 is a view showing detection probabilities of the time state and the phase state according to the increase in dimension of the transmission information. Referring to FIG. 13, based on a 4-dimensional technique capable of transmitting 2 bits of information per photon, when consecutive time states enter the same SPD, a probability that a later transmitted signal will not be detected is approximately 37.5% (3/4*100%).

FIG. 12 is a view showing a case where the high-dimensional quantum information is transmitted using the phase state. Referring to FIG. 12, in the case of the phase state, a time delay interferometer is used for the signal detection in the SPD, and as the dimension of the transmission information increases, signals passing through the interferometer at locations of more time bins are probabilistically distributed and shown as shown in reference numerals 1210 and 1220 in FIG. 12, so the detection efficiency in the SPD may be deteriorated.

Referring back to FIG. 13, when the high-dimensional quantum information is transmitted using the phase state, there is a detection possibility in the time bin while the phase state is used at a probability of 50% in the case of 2-dimension in which 1 bit of information is transmitted and at a probability of 25% in the case of 4-dimension in which 2 bits of information is transmitted, so information loss in the detection process is very large, which makes it difficult to use for a quantum communication purpose. In conclusion, it can be seen that in both the case where the high-dimensional quantum information is transmitted using the time state and the case where the high-dimensional quantum information is transmitted using the phase state, there is a problem in that the detection probability of the transmitted quantum state decreases as the dimension of the transmission information increases.

For reliable information transmission in the QSDC protocol for the quantum communication technique, the problem that the detection probability of the transmitted quantum state decreases as the dimension of the transmission information increases must be solved. To this end, the present disclosure proposes a method for solving the problem in that the detection probability of the transmitted quantum state decreases as the dimension of the transmission information increases while applying the high-dimensional quantum information transmission technique to the single photon-based QSDC technique. More specifically, the present disclosure proposes a method for configuring the transmission information in N dimensions using differential time information of the time state in the single photon-based QSDC technique. To this end, a differential time coding based N-dimensional QSDC technique is proposed. The differential time coding based N-dimensional QSDC technique is a method that transmits information based on a differential time between (i) an initial time state and (ii) an encoding time state including information, and restores the transmitted information based on the differential time. Further, proposed is a method that generates an initial state including a time interval considering the dead time of the SPD in order to solve the problem in that the detection efficiency decreases as the dimension of the transmission information increases. Through the methods proposed by the present disclosure, classical information of $$[\log_2 N]$$

bits per time state may be safely transmitted.

Prior to describing the methods proposed by the present disclosure, for helping understanding the methods proposed by the present disclosure, a basic configuration and characteristics of the single photo-based QSDC technique will be first described.

Figure 14:
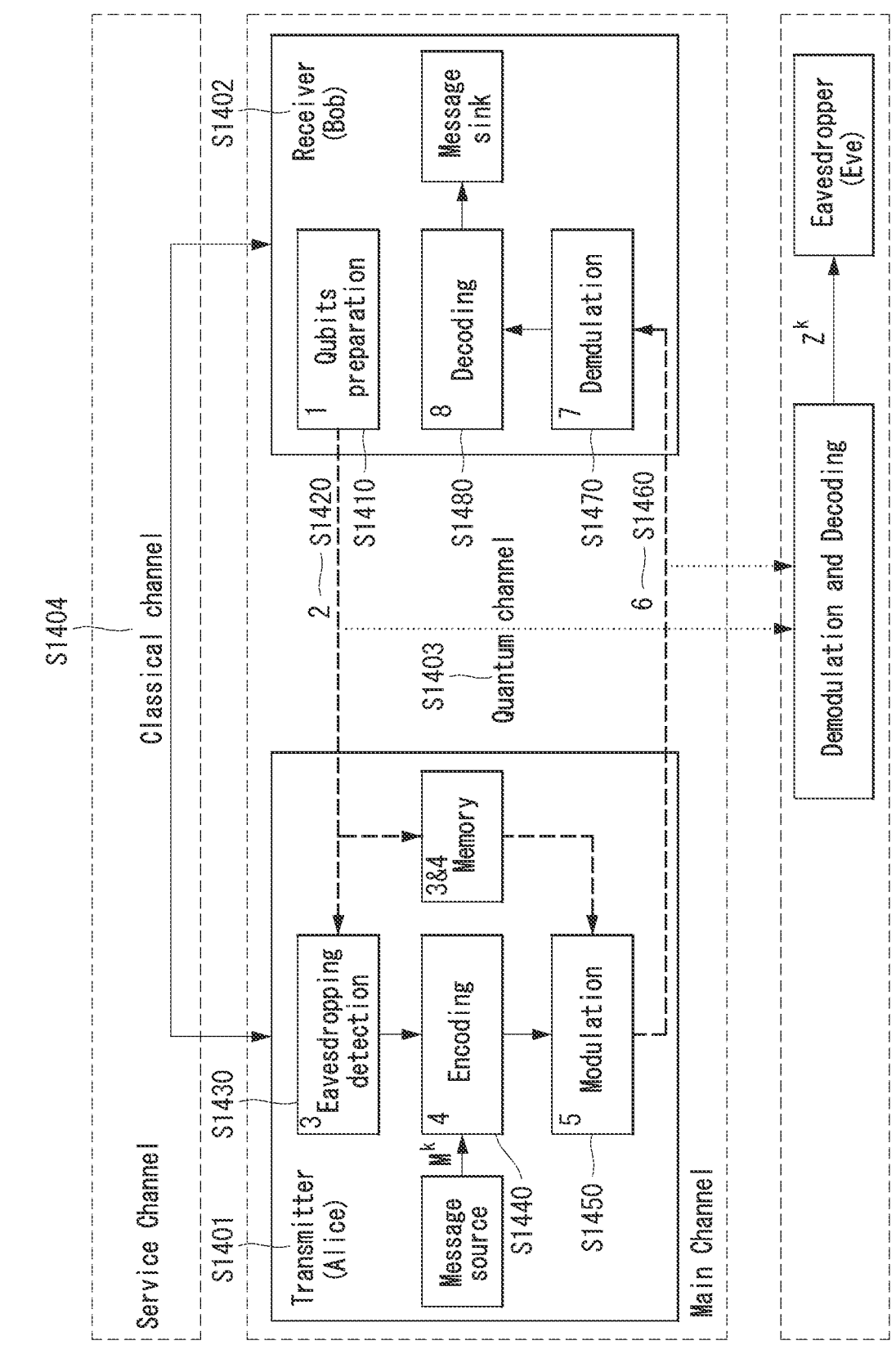
FIG. 14 is a diagram showing an example of an overall configuration and an overall performance process of the existing single-photon-based DL04 QSDC technique.

FIG. 14 is a diagram showing an example of an overall configuration and an overall performance process of the existing single-photon-based DL04 QSDC technique.

Unlike the QKD technique, which is the secret key sharing protocol of the quantum cryptographic communication system, the single photon-based DL04 QSDC technique is a technique that directly transmits the message (information) to be transmitted through the quantum channel, and may transmit 1 bit of classical information per photon.

Referring to FIG. 14, the DL04 QSDC protocol in which the DL04 QSDC technique is performed may be constituted by transmitting and receiving ends 1401 and 1402, a quantum channel 1403, and a classical channel 1404.

S1410: The receiving end (Bob) 1402 configures a polarization information based single photon column. Each of the single photo $$|0\rangle = \begin{bmatrix} 1 \\ 0 \end{bmatrix}^{int}, |1\rangle = \begin{bmatrix} 0 \\ 1 \end{bmatrix}^{d}, |+\rangle = \frac{1}{\sqrt{2}}\begin{bmatrix} 1 \\ 1 \end{bmatrix}^{colur}, \text{ and } |-\rangle = \begin{bmatrix} 1 \\ -1 \end{bmatrix}.$$

four states, may be randomly generated.

S1420: Next, the receiving end 1402 transmits the generated single photon column to the transmitting end (Alice) 1401

S1430: Thereafter, the transmitting end 1401 randomly selects some of the single photons included in the received single photon column, and then selects an orthogonal or diagonal basis, and performs measurement. At this time, the transmitting end 1401 may inform the receiving end 1402 of a selected location, a measurement basis value, and a measurement result through a public channel. The receiving end 1402 may determine whether there is an eavesdropper by estimating QBER which is an error ratio based on the information received from the transmitting end 1401. When a value of the QBER is larger than a reference value for determining whether there is an eavesdropping, the receiving end 1402 determines that the quantum channel is not safe, and stops communication. In the opposite case, the receiving end 1402 may perform subsequent operations.

S1440 to S1450: The transmitting end 1401 encodes a message (information) to be transmitted based on the remaining single photon columns excluding the single photons used for the QBER estimation among all single photons included in the received single photon string in step S1420. Here, the encoding may be performed through an identity operation denoted by I which causes no change when the information included in the message is 0, and performed through a unitary operation defined by U when the information is 1. The unitary operation may include $$U|0\rangle = -|1\rangle, U|1\rangle = |0\rangle, U|+\rangle = |-\rangle \text{ and } U|-\rangle = -|+\rangle.$$

S1460: Next, the transmitting end 1401 transmits the encoded signal photon column to the receiving end 1402. Here, the receiving end 1402 measures each single photon by using the same basis information as an initial measurement basis in order to read the message (information) from the transmitted single photon column. Some information of the same basis information as the initial measurement basis may be used for QBER measurement, and the receiving end 1402 may receive a location of a photo and a value of an encoding bit to be used for the QBER estimation from the transmitting end 1401 through the public channel.

S1470 to S1480: The receiving end 1402 may determine values of parameters to be used for decoding based on the measured QBER value and perform decoding on the received message.

Through steps S1410 to S1480, in the QSDC technique, message information generated by the transmitting end may be safely transmitted to the receiving end through the quantum channel. In other words, the transmitting end may perform the QBER estimation for the initial state generated by the receiving unit and confirm whether the initial state is safe from the eavesdropper based on the QBER estimation, so the message information may be encoded in the initial state guaranteed to be safe from the eavesdropper. Therefore, even if the eavesdropper exists in a backward quantum channel, a eavesdropper who does not know the value of the initial state may not acquire meaningful message information from the encoded message even if the eavesdropper eavesdrops the encoded message, and as a result, safety may be guaranteed.

The single photon-based QSDC technique described in FIG. 14 may have high security without using a quantum secret key, but has a limitation that only 1 bit of classical information per photon is enabled to be transmitted, and the maximum data rate does not exceed of the maximum detection speed of the SPD due to the dead time of the SPD. Differential Time Coding Based N-Dimensional QSDC Technique Hereinafter, the single photon based N-dimensional QSDC method using the differential time coding proposed by the present disclosure will be described in detail.

Figure 15:
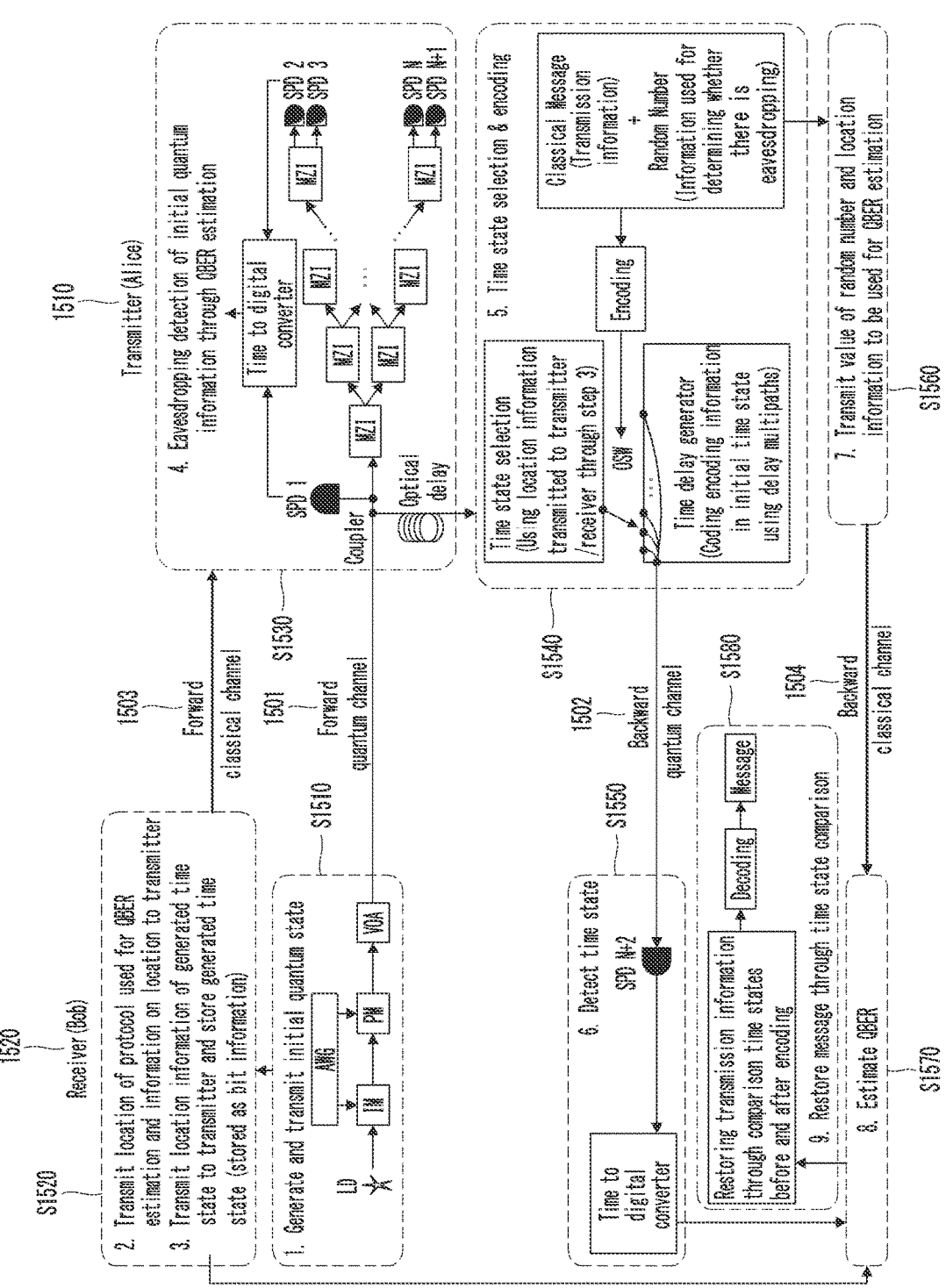
FIG. 15 is a view showing an example of an overall configuration and an overall performance process of a single photo-based N-dimensional QSDC method using differential time coding proposed by the present disclosure.

FIG. 15 is a view showing an example of an overall configuration and an overall performance process of a single photo-based N-dimensional QSDC method using differential time coding proposed by the present disclosure.

Referring to FIG. 15, the QSDC protocol in which the single photo-based N-dimensional QSDC method using differential time coding proposed by the present disclosure is performed may be constituted by transmitting and receiving ends 1510 and 1520, forward and backward quantum channels 1501 and 1502, and forward and backward classical channels 1503 and 1504. A process of performing the single photo-based N-dimensional QSDC method using the differential time coding will be described through S1510 to S1580 of FIG. 15.

S1510: First, the receiving end 1520 randomly generates an N(N>=2) dimensional time state or phase state, and transmits the generated time state or phase state to the transmitting end through the forward quantum channel 1501. Here, the time state and phase state may be at least one.

S1520: Next, the receiving end 1520 (*i*) transmits location information of the time state and the phase state used for QBER estimation in the transmitting end 1510 to the transmitting end 1510 through the forward classical channel 1503. At this time, the time state and the phase state used for the QBER estimation in the transmitting end 1510 may be part of the overall time state and phase state generated by the receiving end 1520. In addition, the receiving end 1520 transmits the location information of the time state generated by the receiving end 1520 to the transmitting end 1510 through the forward classical channel 1503. At this time, the receiving end 1520 may store a value (bit information) of the generated time state.

S1530: The transmitting end 1510 determines whether there is an eavesdropping based on the time state and the phase state used for the QBER estimation received from the receiving end 1520. The determination of whether there is the eavesdropping may be to determine whether the initial state including the time state and the phase state generated by the receiving end 1520 is being eavesdropped by the eavesdropper through the forward quantum channel 1501.

S1540: When the transmitting end 1510 confirms that the initial state including the time state and the phase state generated by the receiving end 1520 is not being eavesdropped, the transmitting end 1510 selects only the time state among the remaining initial states other than the initial state used for determining whether there is the eavesdropping, and encodes a message (information), and transmits the encoded message to the receiving end 1520 through the backward quantum channel 1502. When performing encoding, the transmitting end 1510 may encode the message information by adding, to the message information, random number information used to determine whether there is the eavesdropping based on the QBER estimation in the receiving end 1520.

S1550: The receiving end 1520 detects the time state from the encoded message received from the transmitting end. The time state detected from the encoded message may be a time state in which a time delay is applied to the initial time state, and may be called an encoded time state.

S1560: The transmitting end 1510 transmits random number information, including (i) a value of a random number and (ii) information about the location of the random number, used to determine whether there is the eavesdropping based on the QBER estimation in the receiving end 1520, to the receiving end 1520 through the backward classical channel 1504.

S1570: Thereafter, the receiving end 1520 performs the QBER estimation based on the time state detected in step S1550 and the random number information received in step S1560, and determines whether there is the eavesdropping by the eavesdropper of the backward quantum channel 1502.

S1580: The receiving end 1520 restores the message (information) transmitted from the transmitting end 1510 through comparison between the initial time state and the encoded time state.

Steps S1510 to S1580 described above with reference to FIG. 15 are intended to schematically show the performance process of the single photon based N-dimensional QSDC method using the differential time coding, and hereinafter, each of steps S1510 to S1580 will be described in more detail.

First, the method for generating the time state and phase state corresponding to step S1510 of FIG. 15 will be described.

Time State Generation Method

Figure 16:
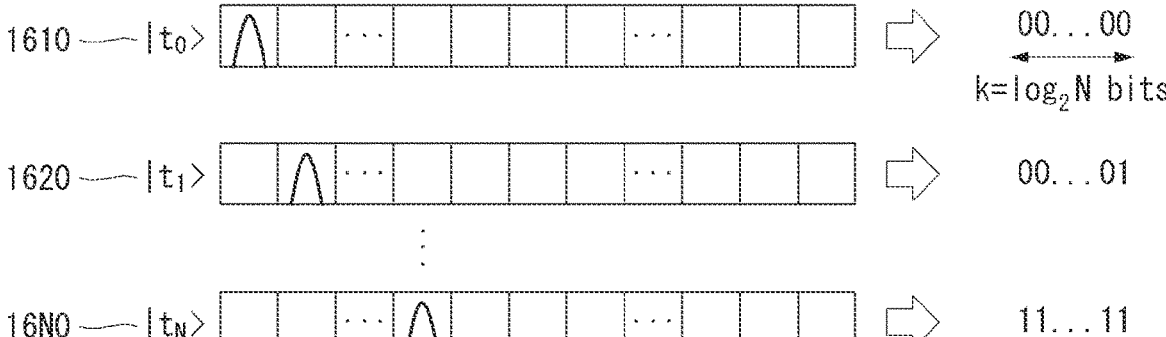
FIG. 16 is a view showing an example of an N-dimensional time state generation method proposed by the present disclosure.

FIG. 16 is a view showing an example of an N-dimensional time state generation method proposed by the present disclosure.

Referring to FIG. 16, |t$_i$⟩ (1610 to 16N0) may be expressed as a form in which a single state is divided into N time bins, and then an optical wave packet exists in an i-th located time bin among N time bins constituting the time state. The value of the transmitted classical information may be determined based on which time bin of the N time bins constituting the time state the optical packet exists.

Figure 17:
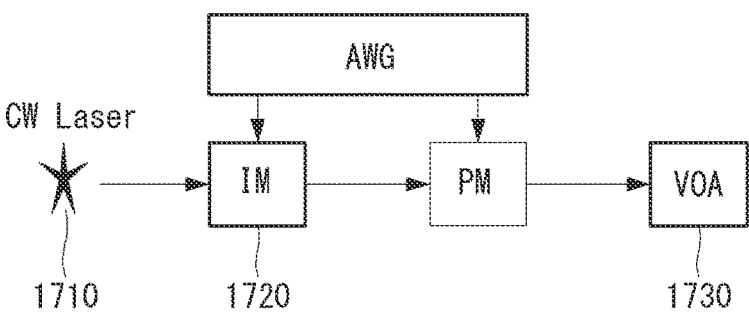
FIG. 17 is a view showing an example of a generation process of a time state.

FIG. 17 is a view showing an example of a generation process of a time state. Referring to FIG. 17, the generation process of the time state may be summarized as follows. (1) A wave pulse is generated using a continuous laser 1710. (2) An initial time state is generated using an IM 1720. (3) The generated initial time state is converted into a single photo-level signal using a VOA 1730.

Figure 18:
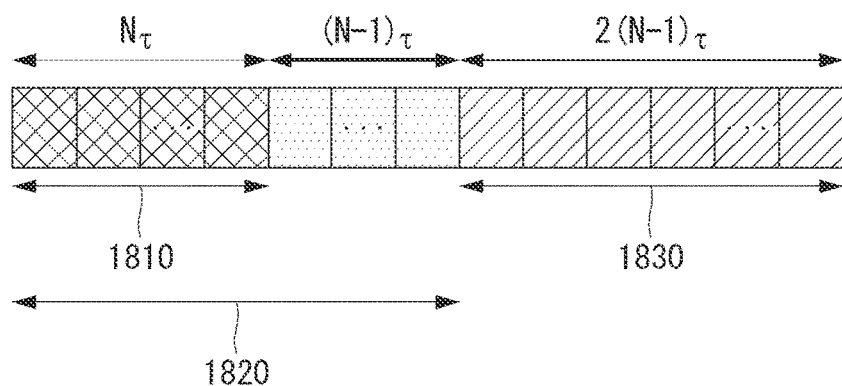
FIG. 18 is a view showing an example of an N-dimensional time state configuration method proposed by the present disclosure.

FIG. 18 is a view showing an example of an N-dimensional time state configuration method proposed by the present disclosure. More specifically, FIG. 18 is a view showing an example of the time state generated considering the dead time of the SPD. In FIG. 18, reference numeral 1810 represents a time domain used for initial time state allocation, and t represents a time corresponding to a width of one time bin. If information that the transmitting end wants to transmit is configured in N dimensions, reference numeral 1810 may be constituted by N time bins, and a time length of reference numeral 1810 may become N*τ. In FIG. 18, reference numeral 1820 represents a time domain used to allocate the time state to information acquired by encoding information which the transmitting end wants to transmit. The time state allocated to the information acquired by encoding the information that the transmitting end wants to transmit may be called an encoding time state. When the information which the transmitting end wants to transmit is configured in N dimensions, reference numeral 1820 may be constituted by (2N−1) time bins. Reference numeral 1830 represents a time domain corresponding to the dead time of the SPD which may guarantee that the encoding time state transmitted to the receiving end is detected in the SPD of the receiving end. Here, a time length of reference numeral 1830 may be defined to accurately coincide with the dead time of the SPD of the receiving end. When the information which the transmitting end wants to transmit is configured in N dimensions, reference numeral 1830 may be constituted by (2N−1) time bins. In this case, a time length corresponding to (2N−1) time bins may coincide with the dead time of the SPD. That is, according to the time state generation method proposed by the present disclosure, the time state is configured to include a time interval equal to the dead time of the single photo detector of the receiving end.

More specifically, when the transmitting end transmits two encoding time states to the receiving end, the encoding time state transmitted first among the two encoding time states may include a wave packet in a 2N−1$^{st}$ time bin of reference numeral 1820, and the encoding time state transmitted later may include the wave packet in a first time bin of reference numeral 1820. This case corresponds to a case where a time interval between the wave packet of the encoding time state transmitted first and the wave packet of the encoding time state transmitted later the shortest. When the two encoding time states do not the time domain corresponding to reference numeral 1830, the SPD of the receiving end fails to detect the wave packet included in the encoding time state transmitted later. On the other hand, since the time state proposed in FIG. 18 includes reference numeral 1830, which is the time domain corresponding to the dead time of the SPD, even when the time interval between the wave packet in the encoding time state transmitted first and the wave packet in the encoding time state transmitted later is the shortest, it is possible to successfully detect the wave packet of the encoding time state transmitted later. The time state is generated according to the method shown in FIG. 18 to prevent the time state from being not detected due to the dead time of the SPD.

Phase State Generation Method

FIG. 19 is a view showing an example of an N-dimensional phase state generation method proposed by the present disclosure.

Referring to FIG. 19, |f$_n$⟩ (1910 to 19N0), which is an N-dimensional phase state, is configured in a form in which wave packets of the same size are included in each of the N time bins within a single state, and each wave packet has a relative phase.

The phase state may be understood as a superposition form of time states, and be expressed as in Equation 1 below.

$$|f_n\rangle = \frac{\lambda}{\sqrt{N}} \sum_{m=0}^{N-1} \exp\left(\frac{2mmn}{N}\right)|t_m\rangle, \ n = 0, \ldots, N-1 \qquad \text{[Equation 1]}$$

FIG. 20 is a view showing an example of a generation process of a phase state. Referring to FIG. 20, the generation process of the phase state may be summarized as follows. (1) A wave pulse is generated using a continuous laser 2010. (2) Using IM 2020, wave packets in N time bins are matched to the same intensity to generate the wave packets, and (3) by applying a PM, an initial phase state is generated by applying different phases to respective time bins. (4) The generated initial phase state is converted into a single photo-level signal using a VOA 1740.

Figure 21:
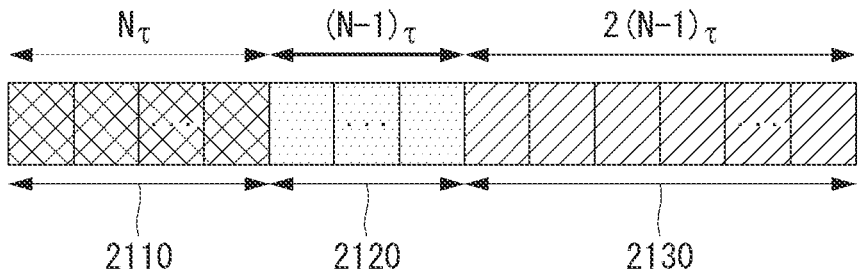
FIG. 21 is a view showing a phase state configuration method proposed by the present disclosure.

FIG. 21 is a view showing a phase state configuration method proposed by the present disclosure. In FIG. 21, reference numeral 2110 represents a time domain used for initial phase state allocation, and t represents a time corresponding to a width of one time bin. If information that the transmitting end wants to transmit is configured in N dimensions, reference numeral 2110 may be constituted by N time bins, and a time length of reference numeral 2110 may become N*Σ. In FIG. 21, reference numeral 2120 represents a time domain corresponding to the delay time required for phase state measurement using an interferometer. When the information which the transmitting end wants to transmit is configured in N dimensions, reference numeral 2120 may be constituted by (N−1) time bins. Reference numeral 2130 represents a time domain required to match the time length of the phase state with the time length of the time state. Since the sum of the time lengths of reference numerals 2110 and 2120 in FIG. 21 is the same as that of reference humeral 1820 in FIG. 18, the time length of reference numeral 2130 may be configured to be the same as that of reference numeral 1830 in FIG. 18. When the information which the transmitting end wants to transmit is configured in N dimensions, reference numeral 2130 may be constituted by 2(N−1) time bins. According to the phase state generation method proposed by the present disclosure, the phase state is configured to include a time interval equal to the dead time of the single photo detector of the receiving end.

Detection Method of Time State and Phase State

Hereinafter, a method for detecting a time state and a phase state by the SPD in the receiving end will be described.

Figure 22:
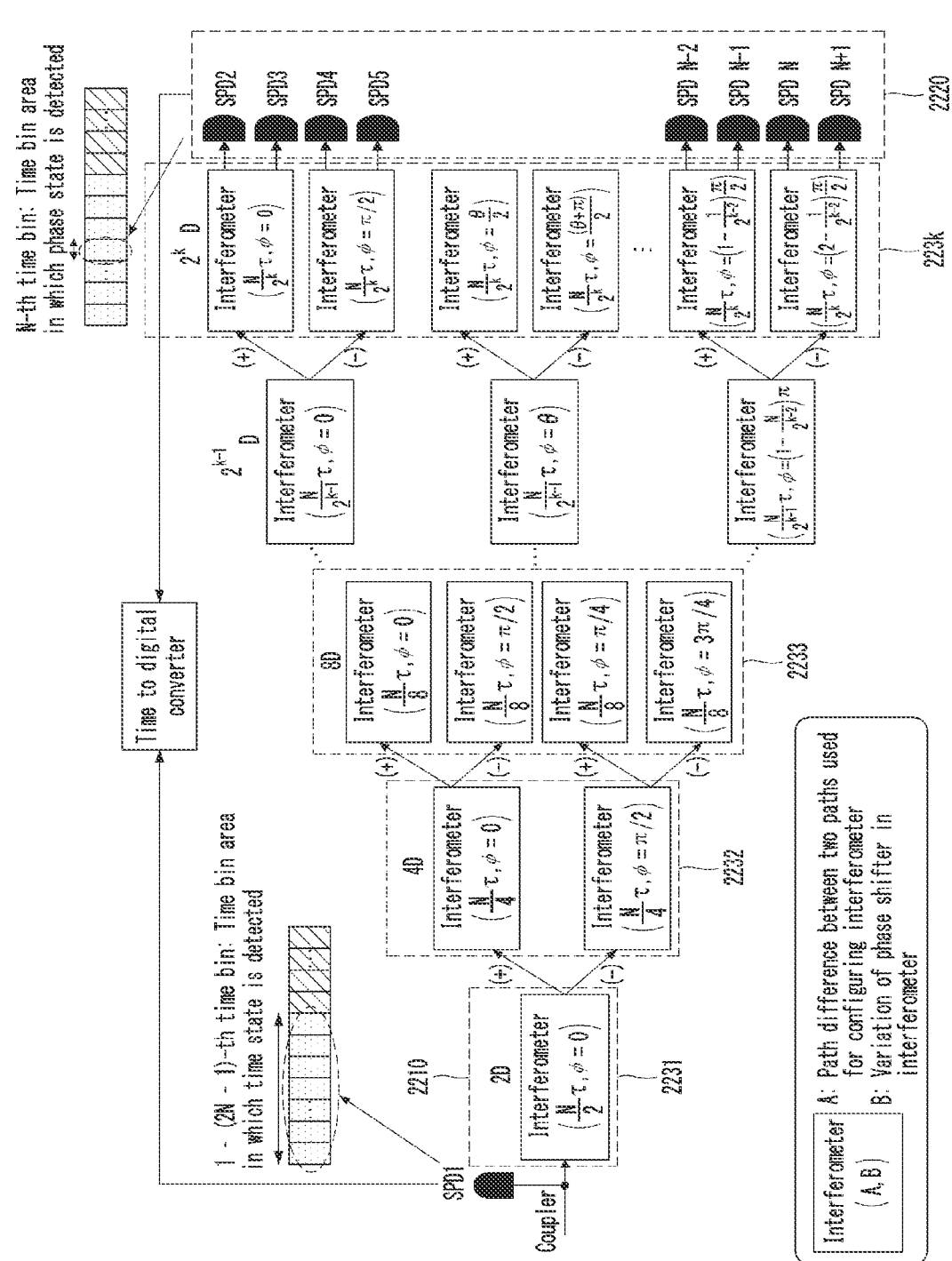
FIG. 22 is a view showing an example of a method for detecting quantum information of an N-dimensional phase state and an N-dimensional phase state proposed by the present disclosure.

FIG. 22 is a view showing an example of a method for detecting the time state and the phase state by the SPD of the receiving end proposed by the present disclosure.

Referring to FIG. 22, it can be seen that one SPD 2210 and N SPDs 2220 are used to detect N-dimensional time state and phase state information, respectively. In addition, N−1 time delay interferometers are used to detect the phase state (2231 to 223*k*), and the path difference and degree of variation of each interferometer used in the N=2k dimension are defined as shown in interferometers included in 2231 to 223*k*, respectively. In the case of the time state, transmission information is detected through measurement of a time state corresponding to the timing of a signal detected in SPD1, and in the case of the phase state, among N output paths in the phase state that continuously pass through a tree-structure interferometer, transmission information of the phase state corresponding to one path where constructive interference occurs is detected.

Detailed Operation of Differential Time Coding Based N-Dimensional QSDC Method

Each of steps S1510 to S1580 of FIG. 15 above will be described in more detail based on the generation method and the detection method of the time state and the phase state described above.

(Initial Quantum State Generation and Transmission Step)

Figure 23:
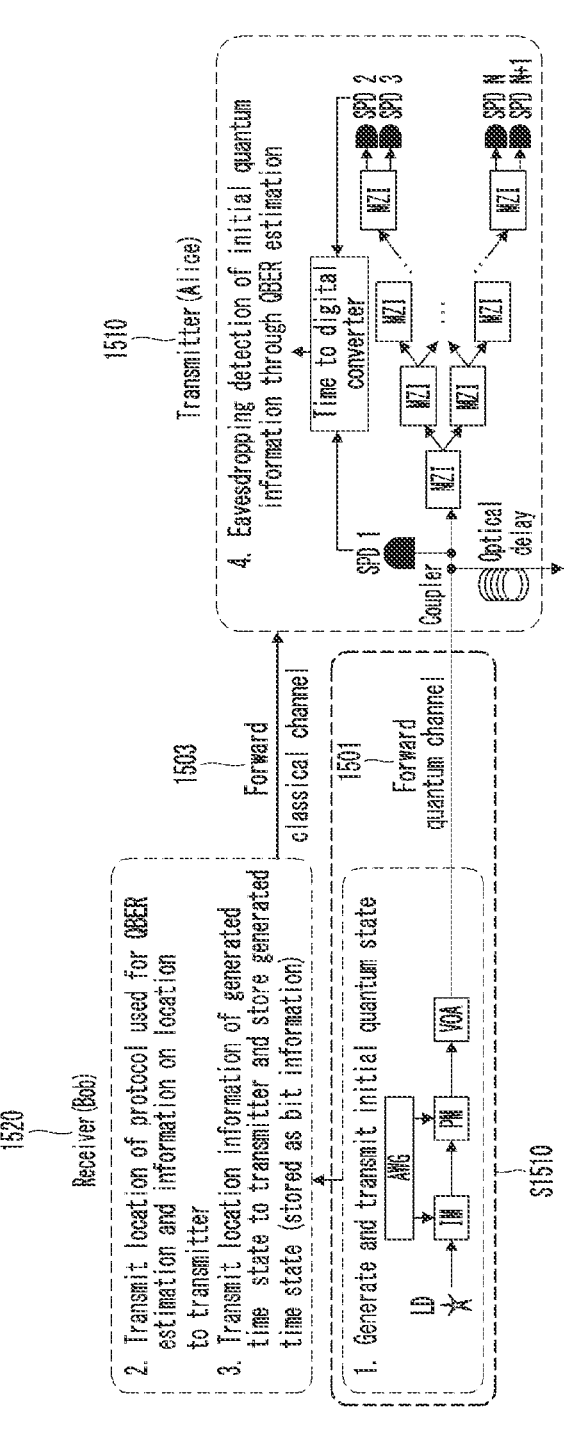
FIG. 23 is a view showing an example of a generation method of a time state and a phase state proposed by the present disclosure.

This step may correspond to step S1510 of FIG. 15. FIG. 23 is a view showing an example of a generation method of a time state and a phase state proposed by the present disclosure.

Referring to FIG. 23, the receiving end 1520 generates the initial time state and initial phase state through intensity modulation (IM) and phase modulation (PM), and then attenuates the intensity to the single photon level, and transmits the intensity-attenuated initial time state and initial phase state to the transmitting end 1510 through the forward quantum channel 1501.

FIG. 24 is a view showing an example of a time state and a phase state generated by the generation method of the time state and the phase state proposed by the present disclosure.

FIG. 24(*a*) is a view showing an example of a time state generated by the time state generation method proposed by the present disclosure. The time state can be used for (i) QBER estimation to prevent eavesdropping of initial quantum information and (ii) transmission of message information. When the message information is configured in N+1 dimensions, N+1 time states may be generated, and indices of the generated time states may be assigned with from 0 to N.

FIG. 24(*b*) is a view showing an example of a phase state generated by the phase state generation method proposed by the present disclosure. The phase state can only be used only for QBER estimation for preventing the eavesdropping of the initial quantum information.

(Step of Transmitting Information to be Used for QBER Estimation Used for Eavesdropping Detection Through Classical Channel)

This step may correspond to step S1520 of FIG. 15. After the receiving end transmits the initial quantum state to the transmitting end through the quantum channel, some of the generated initial states may be used for QBER estimation for determination the presence or absence of an eavesdropper that may be present in the quantum channel. The receiving end may transmit a location of an initial state (information), measurement basis information, and a measurement value used for the QBER estimation to the transmitting end through the classical channel.

(Step of Transmitting the Location Information of the Initial Time State to the Transmitter and Storing the Value of the Time State)

This step may correspond to step S1520 of FIG. 15. The receiving end may transmit location information for a location of a time state used for message coding to the transmitting end through the classical channel so that the transmitting end may select only an initial time state used for the message coding. More specifically, the transmitting end may select a specific time state used for message coding among the initial time state and the initial phase state stored in optical delay (serving as a quantum memory) based on the location information.

To ensure safety, the operation of the receiving end transmitting the location information must be performed after the receiving end transmits the initial state to the transmitting end through the quantum channel. This is because, if the location information of the initial state is transmitted later than the initial state, the eavesdropper may not secure the initial state location information in advance and may not secure a time to prepare an accurate measurement based on the location information. Therefore, the eavesdropper must performs random basis measurement in order to know the information of the initial state, and in this process, an error of QBER of 11% or more will inevitably occur, and the eavesdropping may be discovered.

The transmitting end may a subsequent process only when, as a result of QBER estimation, it is determined that the QBER value is equal to or less than a reference value for determining whether there is the eavesdropping. If the QBER value is determined to exceed the reference value for determining whether there is the eavesdropping, the transmitting end may discard all previously received initial states and request that the receiving end retransmits a new initial state.

In addition, in the subsequent step of restoring the message information, the receiving end performs a process of comparing the initial time state with the time state after encoding in the transmitting end to restore the message, and to this end, the information included in the initially generated time state may be stored in the memory.

(Step of Confirming Whether Initial State is Eavesdropped)

Figure 25:
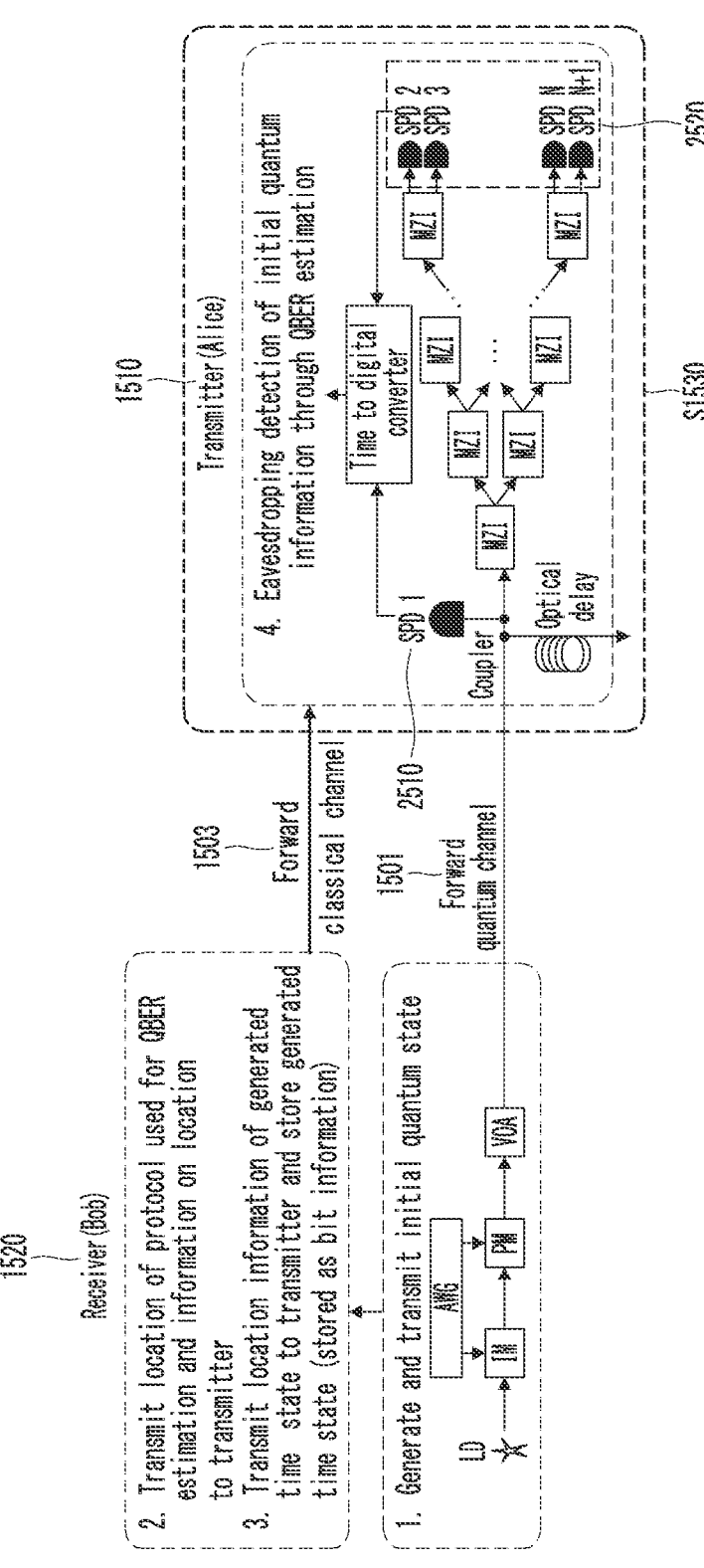
FIG. 25 is a view showing an example of a method for determining whether there is a eavesdropping of an initial state proposed by the present disclosure.

This step may correspond to step S1530 of FIG. 15. FIG. 25 is a view showing an example of a method for determining whether there is a eavesdropping of an initial state proposed by the present disclosure.

Referring to FIG. 25, the transmitting end 1510 may perform QBER estimation to determine whether the initial state transmitted through the quantum channel 1501 is eavesdropped. SPD 1 2510 in FIG. 25 is used for time state measurement (detection of the time state based on location information corresponding to the measured timing), and SPD 2 to (N+1) 2520 are used for phase state measurement.

The transmitting end 1510 may estimate the QBER by comparing the measured result with the information for the QBER estimation received from the receiving end 1520 through the classical channel. If the value of the estimated QBER is determined to be smaller than the reference value for determining whether there is the eavesdropping, the transmitting end 1510 may perform the subsequent operation, and in the opposite case, determine that there is the eavesdropper, and request that the receiving end 1520 retransmits the initial state.

(Initial Time State Selection and Encoding Step)

This step may correspond to step S1540 of FIG. 15. Step S1540 may be understood as operating while being divided into an initial time state selection step S1541 and an encoding step S1542.

Figure 26:
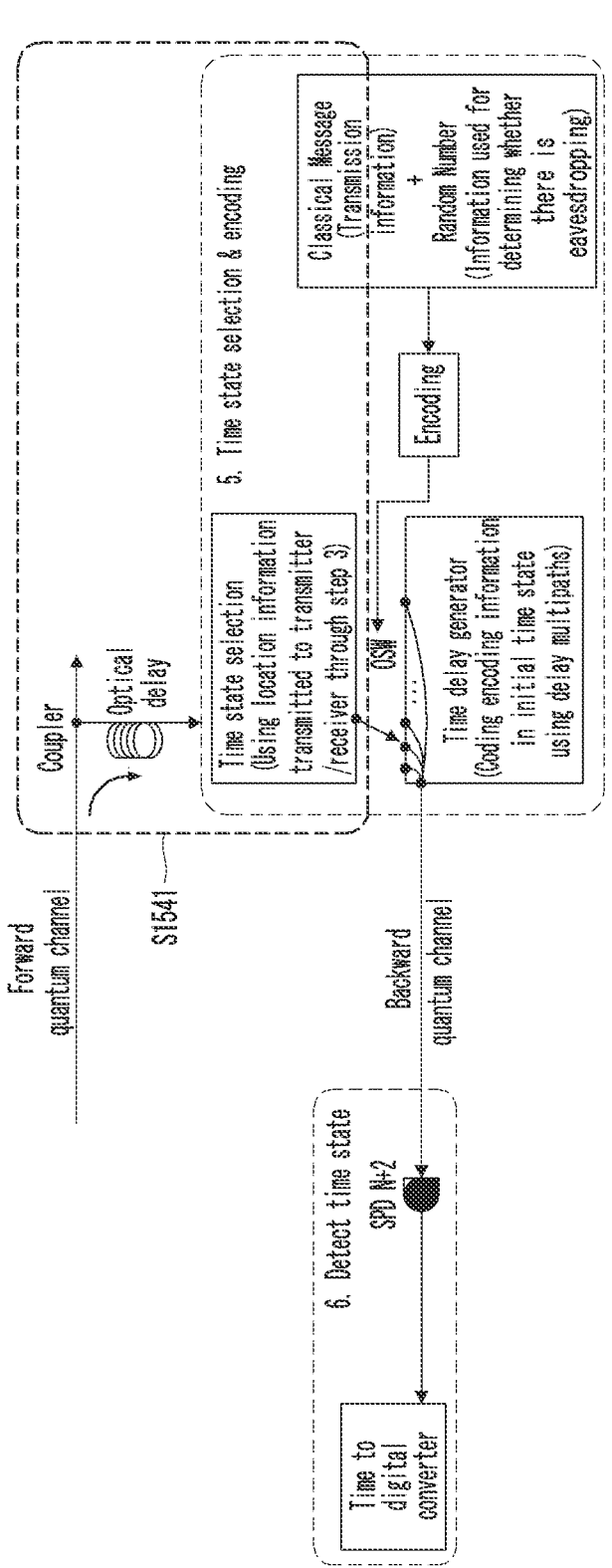
FIG. 26 is a view showing an example of a method for selecting an initial time state proposed by the present disclosure.

FIG. 26 is a view showing an example of a method for selecting an initial time state proposed by the present disclosure.

S1541: A 1:9 Coupler may store an initial state (time state and phase state) that is not used for the QBER estimation in the transmitting end in an optical delay line (or quantum memory). At this time, the stored phase state may be filtered because the stored phase state has low detection efficiency and is not suitable for message coding. More specifically, the phase state is detected by continuously passing the interferometer, so the structure for detecting the phase state causes the problem that the detection efficiency of the phase state decreases significantly as higher-dimensional information is generated, and when this is used as the quantum information transmission technique, undetected message information greatly increases, so the stored phase state must be excluded from message transmission. That is, the stored phase state may be filtered. Afterwards, the transmitting end may select only the initial time state information to be used for message encoding based on the time state location information received in step S1520. In the initial time state information selection process of the transmitting end, the time state may be connected to a path of a location where encoding is to be performed using a 1:N optical switch only at the timing when the time state is extracted from the optical delay.

Figure 27:
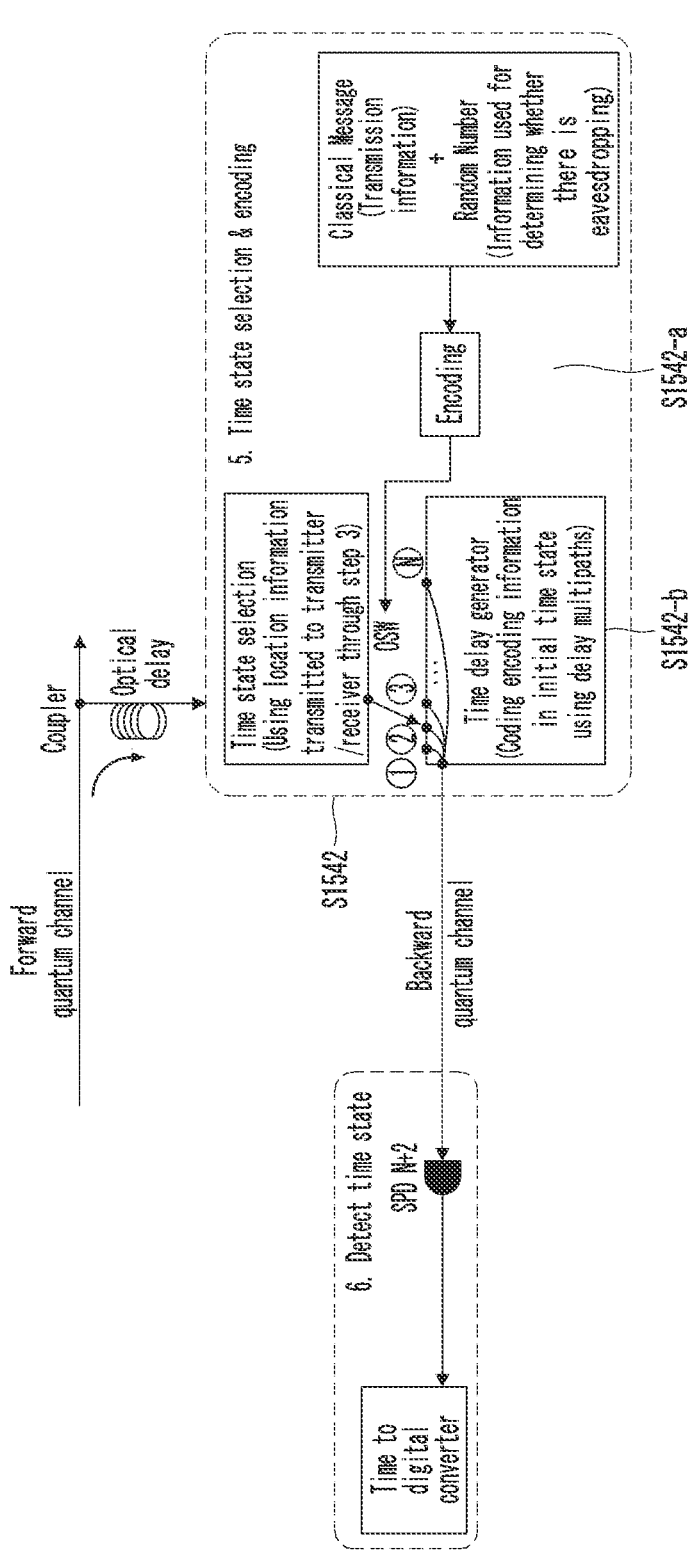
FIG. 27 is a view showing an example of a message coding method proposed by the present disclosure.

Next, the encoding step, that is, a message coding step $1542 is described. FIG. 27 is a diagram illustrating an example of a message coding method proposed by the present disclosure.

S1542-$a$: The transmitting end mixes (adds) random number information to be used to determine whether the backward quantum channel is eavesdropped in the receiving end with (to) the message information to be transmitted to the receiving end, and then encodes the random number information to generate a codeword.

S1542-$b$: Thereafter, the transmitting end performs a process of applying a time delay to combine the initial time state and information corresponding to the message information. Here, the time delay may be expressed variously within the same or similar expression range such as time shift.

The process of combining the initial time state and encoding information in the two steps S1542-$a$ and S1542-$b$ will be described in more detail with reference to FIGS. 28 to 30.

Figure 28:
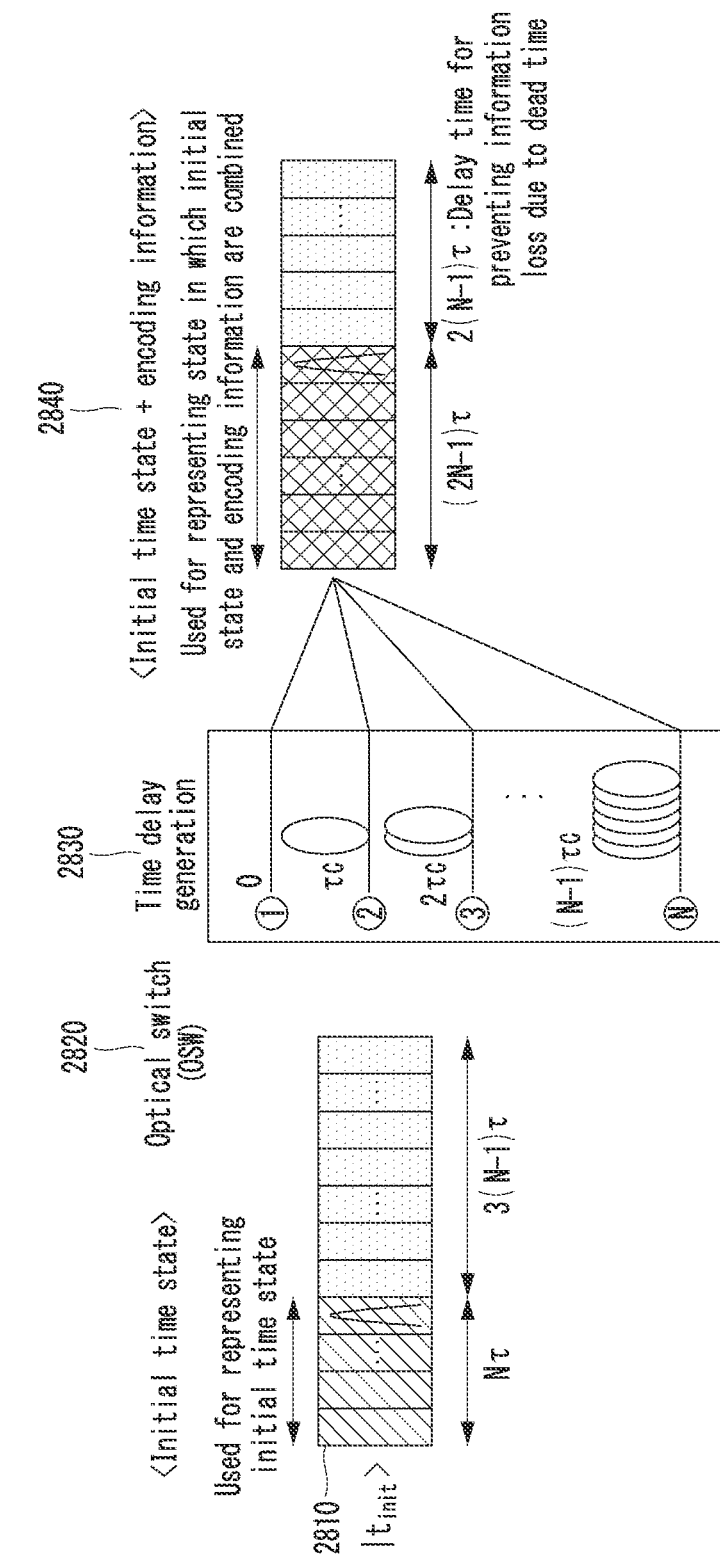
FIG. 28 is a view showing an example of a combination method of an initial time state and encoding information proposed by the present disclosure.

FIG. 28 is a view showing an example of a combination method of a time state and encoding information proposed by the present disclosure.

More specifically, FIG. 28 relates to a case where the dimensions of the initial time state and the time state after encoding are the same. Here, the encoding information may mean a codeword encoded by adding random number information used to determine whether there is the eavesdropping based on QBER estimation in the receiving end to the information which the transmitting end wants to transmit. Referring to FIG. 28, the transmitting end selects an initial time state 2810 stored in the optical delay line as OSW 2820. Thereafter, the time delay corresponding to the message information is allocated to the selected initial time state, $|\tau_{init}\rangle$ (2810). At this time, time the delay allocation to the message information may be performed based on a predefined mapping rule.

FIG. 29 is a view showing an example of a mapping rule defined for time delay allocation to message information. More specifically, FIG. 29 relates to a mapping relationship between encoding information which is an encoded codeword by adding the random number information used for determining whether there is the eavesdropping based on the QBER estimation in the receiving end to the information which the transmitting end wants to transmit, and a time shift. Referring to FIG. 29, a time delay generation (2830) process may be constituted by N multiple paths having different lengths. In this case, N paths may be generated at an interval of $\tau$c from a shortest length (corresponding to path 1 in the above figure, and with a length of 0) to (N−1)$\tau$c which is a longest length. Here, T means an interval between time bins, and c means a speed of an optical signal. Based on the mapping rule of FIG. 29, N$\tau$ initial time states of reference numeral 2810 are converted to encoded time states corresponding to (2N−1)$\tau$ portions of reference numeral 2840. The encoding time state means that the initial time state and the encoding information are combined from first to 2N−1$^{st}$ time bins. In this case, even if the eavesdropper may observe and know the encoding time state transmitted from the transmitting end to the receiving end through the backward quantum channel, the eavesdropper may not know the information of the initial time state, so the eavesdropper may not know the message information which the transmitting end transmits to the receiving end only with the information on the encoding time state, and as a result, the safety of the encoding time state may be guaranteed.

In this method, the dimensions of the initial time state and the encoding time state may be different. That is, the initial state may be N-dimensional and the time state after encoding may be M-dimensional (M≥N).

Figure 30:
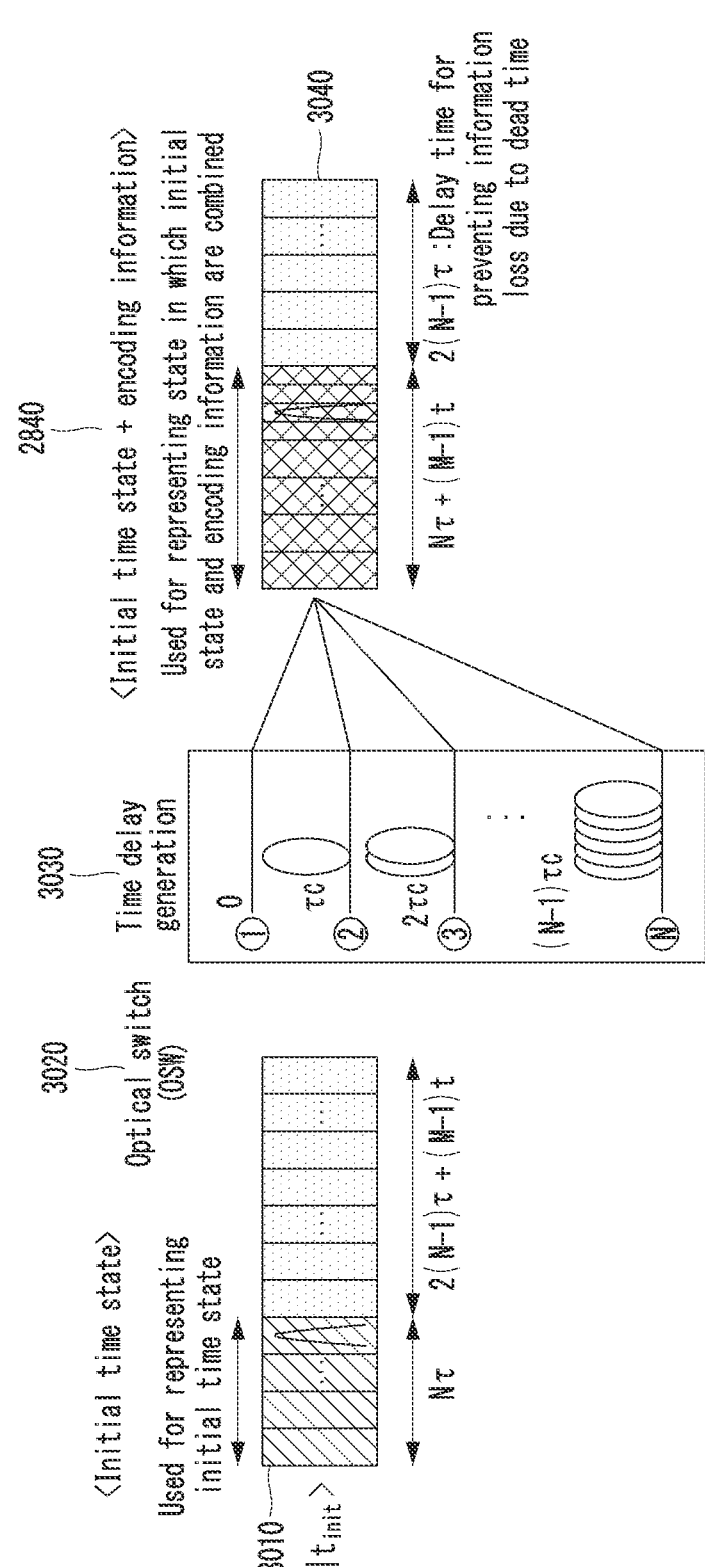
FIG. 30 is a view showing another example of a combination method of the time state and the encoding information proposed by the present disclosure.

FIG. 30 is a view showing another example of a combination method of the time state and the encoding information proposed by the present disclosure. More specifically, FIG. 30 relates to a case where the dimensions of the initial time state and the time state after encoding are different from each other. Referring to FIG. 30, the transmitting end selects an initial time state 3010 stored in the optical delay line as OSW 3020. Here, unlike FIG. 28, a time domain that may be reached after the initial time state 3010 is encoded may be configured as Nτ+(M−1)t. Here, Nτ represents the length of a time domain in which a wave packet may exist in a time state after encoding when performing M-dimensional encoding. At this time, a difference from the case where the dimensions of the time states before and after encoding are the same is that the time interval t of one time bin after encoding is smaller than the interval τ of one time bin before encoding. However, if the condition (M−1)t=(N=1)τ is satisfied, in the case where the dimensions of the time state before and after encoding are different, even though the time state is generated at the same time as the case where the dimensions of the time state before and after encoding are the same, there is an advantage in that classical information of $\log_2 M$ which is classical information more than $\log_2 N$ may be encoded and transmitted.

In the case where the dimensions of the initial time state and the time state after encoding are different from each other, information of a dimension applied in the encoding time state may be previously shared between the transmitting and receiving ends before encoding the initial time state. Through this, when the encoding time state transmitted from the receiving end through the backward quantum channel is restored, the receiving end may restore the message information by considering dimensional transformation before and after encoding.

(Time State Detection Step)

This step may correspond to step S1550 of FIG. 15. The receiving end receives encoding time state information through a backward quantum channel and detects the received encoding time state information through an SPD.

(Step of Transmitting Information of Random Number to be Used for QBER Estimation)

This step may correspond to step S1560 of FIG. 15. The transmitting end may transmit, to the receiving end on a classical channel, information on a location and a value of the random number added to the message information for QBER estimation for encoding time state information.

(QBER Estimation Step)

This step may correspond to step S1570 of FIG. 15. FIG. 31 is a view showing an example of a method for estimating QBER in a reverse quantum channel proposed by the present disclosure. Referring to FIG. 31, the receiving end restores encoded information by comparing the encoding time state measured in step S1550 with the information on the initial time state stored in step S1520, and then determines the QBER by comparing the restored information, and the value/location of the random number used for the QBER received from the transmitting end in step S1560. The QBER estimation value acquired in this step may be used for determining a primary parameter used in a decoding process of an error correction code used in step S1580 of FIG. 15.

(Step of Restoring Original Message Through Comparison Time States Before and After Encoding)

This step may correspond to step S1580 of FIG. 15. The receiving receives the encoding time state from the transmitting end on the quantum channel, and measures the received encoding time state. Thereafter, the receiving end restores the encoded information through a differential time between the measured encoding time state information and the initial time state information stored in the memory of the receiving end in step S1520. For example, when a time state initially generated in 4-dimensional QSDC is $|t_0\rangle$ , and the receiving end stores 00 which is classical information included in $|t_0\rangle$ in step S1520, the transmitting end may convert information called 10 into $|t_2\rangle$ by giving a time delay equal to two-spaces time bins in order to encode the information into Next, the transmitting end may transmit the converted time state information to the receiving end, and the receiving end may restore 10 which is encoding information corresponding to a differential time between and Thereafter, the receiving end decodes measurement information of the encoding time state to restore original message information.

Expected Effect

Hereinafter, a result of validating an expected effect of the method proposed by the present disclosure in three terms will be described.

More specifically, (1) in terms of information transmission amount, a validation result of the expected effect through comparison of the method proposed by the present disclosure with the existing QSDC technique that may transmit 1 bit of information per photon, (2) in terms of a data rate, a validation result for the expected effect through comparison of the existing QSDC technique and the method proposed by the present disclosure. In addition, (3) a validation result for the expected effect through comparison the QSDC technique to which time phase coding which is the existing high-dimensional quantum information transmission technique is applied by simulating the date rate by increasing the transmission distance and the dimension after experimental configuration with a commercial device, and the method proposed by the present disclosure will be described.

Validation of Improvement Effect of Information Transmission Amount Per Photon According to Dimensional Increase The existing single photon based QSDC technique may transmit 1 bit/photon of information at the maximum detection speed of the SPD. On the other hand, when the differential time coding based QSDC technique proposed by the present disclosure is configured in k dimensions, $[\log_2 k]$ bits/photon information is enabled to be transmitted at the maximum detection speed of the SPD.

In addition, considering that the current maximum signal generation speed of the laser is 104 times or more higher than the maximum detection speed of the SPD, higher-dimensional quantum information may be generated by increasing the signal generation speed of the light source compared to the maximum detection speed of the SPD. At this time, the information transmission amount improvement effect is as shown in FIG. 32.

FIG. 32 is a view showing a transmission volume improvement effect for a case of generating high-dimensional quantum information by a scheme of increasing a signal generation speed of a light source compared to a maximum detection speed of an SPD.

The dead time T of the SPD shown in FIG. 32 means (2k−1)τ, which corresponds to a generation time of 2k−1 time bins based on the number of time bins generated in the proposed method. Additionally, a time τ, which corresponds to the length of a single time bin, represents the signal generation time of the laser. Referring to the results in FIG. 32, in the method proposed by the present disclosure, the faster the laser light source generation speed, the more time bins may be formed within the same dead time, making high-dimensional information transmission possible, and the faster the light source generation speed, the improvement effecting terms of the information transmission amount becomes greater compared to the existing QSDC technique. Validation of Data Rate Improvement Effect in Method Proposed by Present Disclosure FIG. 33 is a view showing an example of a quantum state generation time in the existing QSDC technique and the method proposed by the present disclosure.

FIG. 33(*a*) is a view showing a quantum state generation time in the existing single photon based QSDC technique. In the existing single photon based QSDC technique, 1 bit of information per a single state may be transmitted based on the dead time of the SPD. Additionally, as shown in FIG. 33(*a*), a time required to configure each polarization based quantum state is equal to the dead time of the SPD.

FIG. 33(*b*) is a view showing a quantum state generation time in a differential time coding based k-dimensional QSDC method proposed by the present disclosure. Referring to FIG. 33(*b*), it can be seen that in the method proposed by the present disclosure, information of $$[\log_2 k]$$

bits is enabled to be transmitted every time approximately twice the dead time of the SPD in order to eliminate information loss that occurs during the detection process of the time state. A time interval between time states received from the SPD must be secured at least as long as the dead time of the SPD to enable accurate information detection from the SPD, so the method proposed by the present disclosure requires a longer delay time than the existing technique.

FIG. 34 is a view a result of comparing an improvement effect in terms of a data rate of an invented technique according to an increase in dimension with a data rate in an existing QSDC technique.

Referring to the results in FIG. 34, it can be seen that considering the time required to generate a single quantum state, the present technique has a higher data rate than the existing single photon based QSDC technique when transmitting quantum information in four dimensions or more.

Comparison in data rate between the method proposed by the present disclosure and the method of applying the existing high-dimensional quantum transmission technique to the QSDC (Comparison of Data Rate Simulation Result According to Increase in Dimension and Transmission Distance Using Commercial Device)

While increasing the dimension, and the transmission distance of the quantum channel, (i) a data rate in a method of applying a time phase state based quantum information generation and detection technique which is the high-dimensional quantum information transmission method used in the QKD technique, and (ii) a data rate in the method proposed by the present disclosure are compared.

The following commercial devices are considered for the simulation.

LD: frequency stabilized continuous laser (Clarity-NLL-1550-HP)

IM and PM: EOSpace

Coupler: Marki Microwave PD30R412

Superconducting nanowire single photon detector (SNSPD, Quantum Opus): high detection efficiency(~70%)

Time to digital converter: Agilent, Acqiris U1051A

Time delay interferometer: L. Fulop, Kylia

Ultra fast 1: N optical switch: EPS010

The following parameters are required for the simulation.

Forward and backward quantum channel loss: $n_{ch} = 10^{-0.2 \cdot 2l/20}$, (1: channel distance, distance loss is 20 dB/km)

Optical delay line loss: $n_{di} = 10^{-0.2 \cdot k/20}$, (k: delay line distance)

Dark count probability: $P_d = 10^{-7}$ (SNSPD)

Intrinsic error in time basis: $P_{ie} = 0.03$

Efficiency of the SPD: $n_d = 0.7 (= 70\%,$ SNSPD)

The total number of signals transmitted by Bob: N=6.25× $10_{10}$ (the number of quantum states generated for 100s=625 MHz)

Mean photon number: μ=0.69

Time state chosen with probability of $P_T = 0.5$

Phase state chosen with probability of $P_T = 0.5$

Detection probability of phase state and time state in M dimensions: $p_p^M$, $p_p^M$ 1:9 Coupler (out of N, 90% are sent to optical delay and the remaining 10% are sent to be used for QBER estimation)

Probability that the quantum state will be sent to from the coupler to the optical delay: $P_c = 0.9$ The data rate of the method proposed by the present disclosure may be calculated according to Equation 2 below.

$$D = \frac{nr - mr}{100 \text{ s(total time required for generating quantum information)}}$$ [Equation 2]

The total number of detection events in Bob's time basis measurement device may be calculated according to Equation 3 below.

$$n_T = P_T \cdot P_c \cdot N \cdot (1 - e^{-n_{ch} \cdot n_{di} \cdot n_d \cdot \mu} + P_d)$$ [Equation 3]

A time state error event may be calculated according to Equation 4 below (The error event in the time basis=$m_T$).

$$m_T = P_T \cdot P_c \cdot N \cdot (P_{ie}(1 - e^{-n_{ch} \cdot n_d \cdot \mu} + P_d)$$ [Equation 4]

The data rate of the high-dimensional QKD technique may be calculated according to Equation 5 below.

$$D = \frac{n_T + n_p - m_T - m_p}{100 \text{ s}}$$ [Equation 5]

The total number of detection events in Bob's phase basis measurement device (=$n_p$) may be calculated according to Equation 6 below.

$$n_p = P_p \cdot P_c \cdot N \cdot p_p^M \cdot (1 - e^{-n_{ch} \cdot n_{di} \cdot n_d \cdot \mu} + P_d)$$ [Equation 6]

35

The total number of detection events in Bob's time basis measurement device By (=$n_T$) may be calculated according to Equation 7 below.

$$n_T = P_T \cdot P_c \cdot N \cdot p_T^M \cdot (1 - e^{-n_{ch} \cdot n_{dI} \cdot n_d \cdot \mu} + P_d) \qquad \text{[Equation 7]}$$

A phase state error event may be calculated according to Equation 8 below (The error event in the phase basis=$m_p$).

$$m_p = P_p \cdot P_c \cdot N \cdot \left( \left( P_{ie} + \frac{1}{2} \right)(1 - e^{-n_{ch} \cdot n_d \cdot \mu} + P_d) \right) \qquad \text{[Equation 8]}$$

The time state error event may be calculated according to Equation 8 below (The error event in the time basis=$m_T$).

$$m_T = P_T \cdot P_c \cdot N \cdot \left( \left( P_{ie} + \frac{1}{2} \right)(1 - e^{-n_{ch} \cdot n_d \cdot \mu} + P_d) \right) \qquad \text{[Equation 9]}$$

Data Rate Simulation Result According to Change in Transmission Distance

Figure 35:
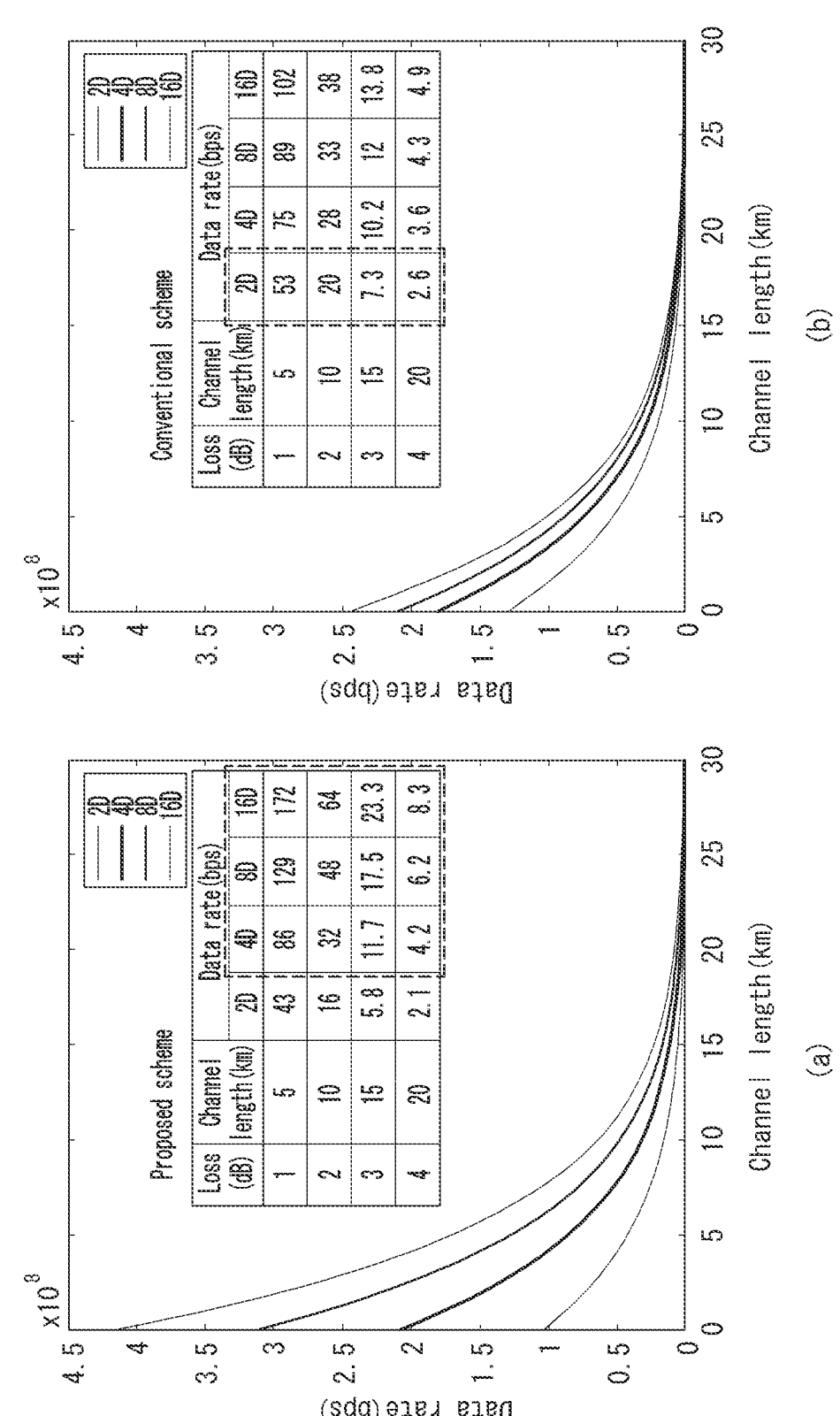
FIG. 35 is a view showing a data rate simulation result according to a transmission distance change.

FIG. 35 is a view showing a data rate simulation result according to a transmission distance change. More specifically, FIG. 35(a) shows a data rate simulation result according to a change in transmission distance when the method proposed by the present disclosure is applied, and FIG. 35(b) shows the data rate simulation result according to the change in transmission distance when the quantum information transmission and measurement method used in the existing time and phase state based QKD technique is applied. Referring to the results in FIGS. 35(a) and 35(b), it can be seen that when the k-dimensional quantum information transmission method is used, a data rate $\lfloor \log_2 k \rfloor$ times higher may be expected compared to the 2-dimensional technique that transmits 1 bit information per photon. In addition, when applying 16 dimensions (4-bit classical information transmission technique per single photon), a high data rate of approximately 172 Mbps may be secured based on a 5 km transmission distance, and a data rate improvement of approximately 70% compared to the existing technique may be expected.

Figure 36:
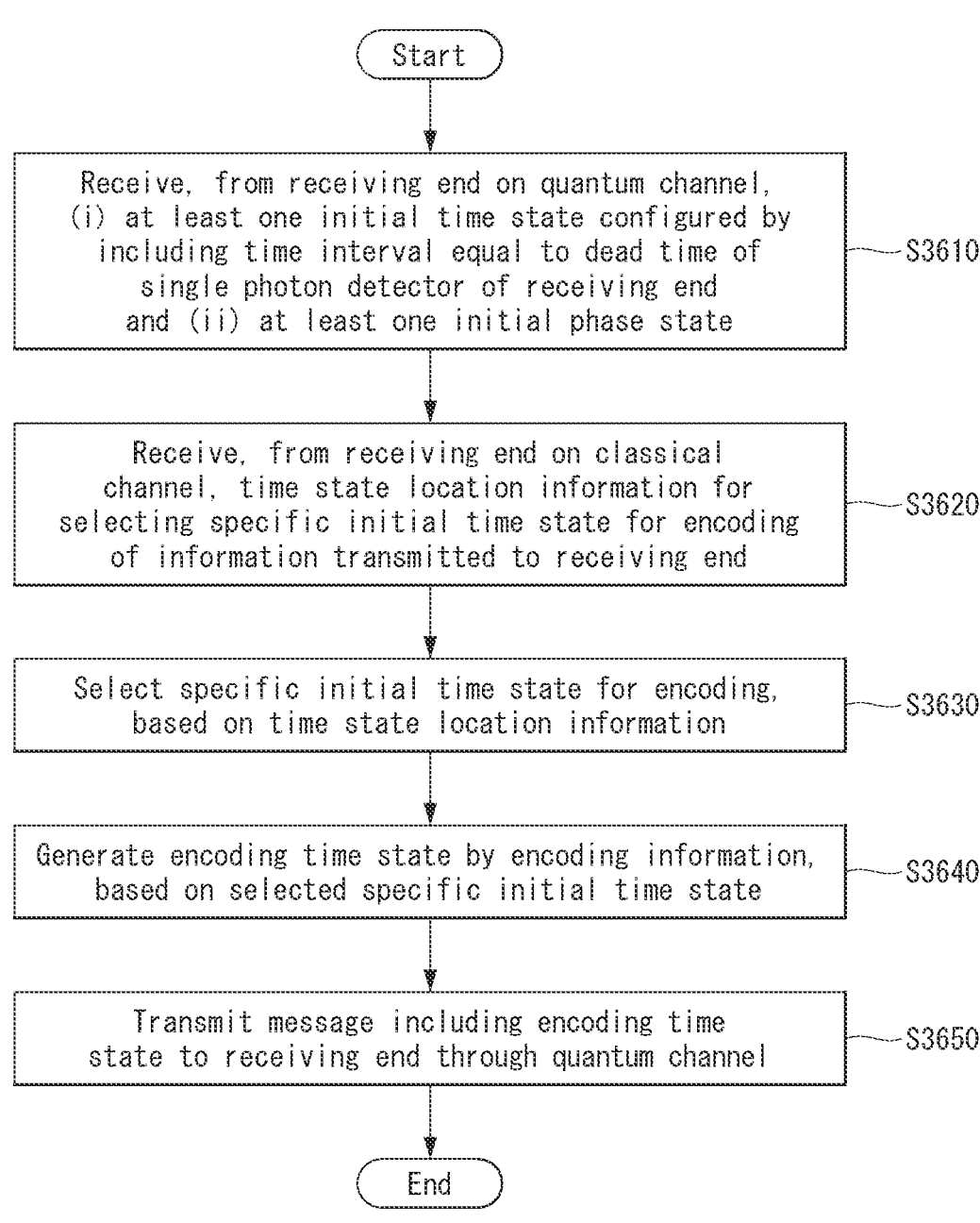
FIG. 36 is a flowchart showing an example of a quantum secure direct communication method for transmitting a message based on differential time coding proposed by the present disclosure.

FIG. 36 is a flowchart showing an example of a quantum secure direct communication method for transmitting a message based on differential time coding proposed by the present disclosure.

First, a transmitting end receives, from a receiving end on a quantum channel, (i) at least one initial time state configured by including a time interval equal to a dead time of a single photon detector of the receiving end (S3610).

Thereafter, the transmitting end receives, from the receiving end on a classical channel, time state location information for selecting a specific initial time state for encoding of information transmitted to the receiving end (S3620).

Next, the transmitting end selects the specific initial time state for the encoding, based on the time state location information (S3630).

Thereafter, the transmitting end generates an encoding time state by encoding the information, based on the selected specific initial time state (S3640).

Here, the encoding time state is generated by applying a time shift based on a value of the information being encoded.

The transmitting end transmits a message including the encoding time state to the receiving end through the quantum channel (S3650).

Here, the message is restored based on a differential time between information on the at least one initial time state information stored in the receiving end and information on the encoding time state.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A quantum secure direct communication (QSDC) method by which a transmitting end transmits a message based on differential time coding, in a quantum communication system, comprising:

receiving, from a receiving end on a quantum channel, (i) at least one initial time state configured by including a time interval equal to a dead time of a single photon detector of the receiving end and (ii) at least one initial phase state;

receiving, from the receiving end on a classical channel, time state location information for selecting a specific initial time state for encoding of information transmitted to the receiving end;

selecting the specific initial time state for the encoding, based on the time state location information;

generating an encoding time state by encoding the information, based on the selected specific initial time state, wherein the encoding time state is generated by applying a time shift based on a value of the information being encoded; and transmitting a message including the encoding time state to the receiving end through the quantum channel, wherein the message is restored based on a differential time between information on the at least one initial time state information stored in the receiving end and information on the encoding time state.

2. The method of claim 1, wherein some initial time states and initial phase states among the at least one initial time state and the at least one initial phase state are used for determining whether there is a eavesdropping on the quantum channel for the at least one initial time state and the at least one initial phase state.

3. The method of claim 2, further comprising receiving, from the receiving end on the classical channel, information on the some initial time states and initial phase states used for determining whether there is the eavesdropping on the quantum channel.

4. The method of claim 3, further comprising determining whether there is the eavesdropping on the quantum channel based on quantum bit error rate (QBER) estimation, based on the information on the some initial time states and initial phase states.

5. The method of claim 4, further comprising requesting retransmission of an initial time state and an initial phase state based on a value of QBER being equal to or more than a specific value according to a result of determining whether there is the eavesdropping.

6. The method of claim 5, wherein selection and encoding of the specific initial time state is performed based on the value of QBER being smaller than the specific value according to the result of determining whether there is the eavesdropping.

7. The method of claim 1, wherein The receiving of the time state location information is performed after receiving (i) the at least one initial time state and (ii) the at least one initial phase state.

8. The method of claim 1, wherein the generating of the encoding time state further includes adding, to the information, a random number used for determining whether there is a eavesdropping in a backward quantum channel, and generating a codeword by encoding the information to which the random number is added.

9. The method of claim 8, further comprising:

transmitting, to the receiving end on the classical channel, random information including (i) a location of the random number and (ii) information on a value of the random number.

10. The method of claim 8, wherein the generating of the encoding time state further includes combining the specific initial time state and the codeword by applying the time shift to the codeword.

11. The method of claim 10, wherein different time shift values are applied to the encoding time state based on a value of the encoded information.

12. The method of claim 11, wherein the application of the different time shift values is performed based on a predefined mapping table, and the mapping table is related to a mapping relationship between the values of the encoded information and the time shift values.

13. The method of claim 10, wherein the specific initial time state and the encoding time state are configured by one or more time bins, and based on a dimension of the specific time state being the same as a dimension of the encoding time state, a length of the time bin constituting the specific initial time state is equal to a length of the time bin constituting the encoding time state.

14. The method of claim 13, wherein based on the dimension of the specific time state being different from the dimension of the encoding time state, the length of the time bin constituting the encoding time state is smaller than the length of the time bin constituting the specific initial time state.

15. The method of claim 14, further comprising:

transmitting, to the receiving end, information on a dimension applied to generation of the encoding time state before generating the encoding time state, based on the dimension of the specific time state being different from the dimension of the encoding time state.

16. A transmitting end performing quantum secure direct communication (QSDC) for transmitting a message based on differential time coding, in a quantum communication system, comprising:

a transmitter for transmitting a radio signal;

a receiver for receiving the radio signal;

at least one processor; and at least one computer memory operably connectable to the at least one processor, and storing instructions of performing operations when executed by the at least one processor, wherein the operations include receiving, from a receiving end on a quantum channel, (i) at least one initial time state configured by including a time interval equal to a dead time of a single photon detector of the receiving end;

receiving, from the receiving end on a classical channel, time state location information for selecting a specific initial time state for encoding of information transmitted to the receiving end;

selecting the specific initial time state for the encoding, based on the time state location information;

generating an encoding time state by encoding the information, based on the selected specific initial time state;

generating the encoding time state by applying a time shift based on a value of the information being encoded; and transmitting a message including the encoding time state to the receiving end through the quantum channel, and wherein the message is restored based on a differential time between information on the at least one initial time state information stored in the receiving end and information on the encoding time state.

17. A quantum secure direct communication (QSDC) method by which a receiving end receives a message based on differential time coding, in a quantum communication system, comprising:

transmitting, to a transmitting end on a quantum channel, (i) at least one initial time state configured by including a time interval equal to a dead time of a single photon detector of the receiving end;

transmitting, to the transmitting end on a classical channel, time state location information for selecting a specific initial time state for encoding of information transmitted to the transmitting end, wherein the specific initial time state for the encoding in the transmitting end is selected based on the time state location information;

receiving, from the transmitting end, a message including an encoding time state generated by applying a time shift based on a value of the information encoded based on the specific initial time state; and restoring the information based on the at least one initial time state information and the encoding time state information stored in the receiving end.

\* \* \* \* \*